(12) United States Patent
Howell et al.

(10) Patent No.: US 11,270,104 B2
(45) Date of Patent: Mar. 8, 2022

(54) SPATIAL AND TEMPORAL SEQUENCE-TO-SEQUENCE MODELING FOR HANDWRITING RECOGNITION

(71) Applicant: Apple Inc., Cupertino, CA (US)

(72) Inventors: Dominic L. Howell, San Jose, CA (US); Jerome R. Bellegarda, Saratoga, CA (US)

(73) Assignee: Apple Inc., Cupertino, CA (US)

(*) Notice: Subject to any disclaimer, the term of this patent is extended or adjusted under 35 U.S.C. 154(b) by 97 days.

(21) Appl. No.: 16/741,384

(22) Filed: Jan. 13, 2020

(65) Prior Publication Data
US 2021/0216760 A1 Jul. 15, 2021

(51) Int. Cl.
G06K 9/00 (2006.01)
G06F 3/04883 (2022.01)
G06K 9/62 (2022.01)

(52) U.S. Cl.
CPC ..... G06K 9/00416 (2013.01); G06F 3/04883 (2013.01); G06K 9/6269 (2013.01); G06K 2209/01 (2013.01)

(58) Field of Classification Search
None
See application file for complete search history.

(56) References Cited

U.S. PATENT DOCUMENTS

| | | | |
|---|---|---|---|
| 5,343,537 A * | 8/1994 | Bellegarda | G06K 9/6217 382/186 |
| 7,542,971 B2 | 6/2009 | Thione et al. | |
| 7,546,529 B2 | 6/2009 | Reynar et al. | |
| 7,584,429 B2 | 9/2009 | Fabritius | |
| 7,634,718 B2 | 12/2009 | Nakajima | |
| 7,996,589 B2 | 8/2011 | Schultz et al. | |
| 8,050,500 B1 | 11/2011 | Batty et al. | |

(Continued)

OTHER PUBLICATIONS

Chang et al., "Monaural Multi-Talker Speech Recognition with Attention Mechanism and Gated Convolutional Networks", Interspeech, Sep. 2-6, 2018, pp. 1586-1590.

(Continued)

*Primary Examiner* — Anand P Bhatnagar
(74) *Attorney, Agent, or Firm* — Dentons US LLP

(57) ABSTRACT

An example process for recognizing handwritten input includes obtaining input data representing handwritten input, where the handwritten input is associated with a first dimension and a second dimension relative to the handwritten input; sampling the input data to obtain a plurality of coordinates representing the handwritten input; determining, based on the plurality of coordinates, a sequence of vectors representing a respective plurality of portions of the handwritten input, where: each portion of the respective plurality of portions is associated with a respective height and width corresponding respectively to the first and second dimensions, the respective height being greater than the respective width; and consecutive vectors of the sequence of vectors represent respective consecutive portions of the handwritten input; generating, using a handwriting recognition model, based on the sequence of vectors, one or more characters for the handwritten input; and causing the one or more characters to be displayed.

57 Claims, 16 Drawing Sheets

(56) References Cited

U.S. PATENT DOCUMENTS

| | | | |
|---|---|---|---|
| 8,290,274 B2* | 10/2012 | Mori | G06K 9/222 382/186 |
| 8,396,295 B2* | 3/2013 | Gao | G06K 9/00416 382/187 |
| 8,457,959 B2 | 6/2013 | Kaiser | |
| 9,633,191 B2 | 4/2017 | Fleizach et al. | |
| 10,354,168 B2* | 7/2019 | Bluche | G06N 3/0445 |
| 10,558,893 B2* | 2/2020 | Bluche | G06K 9/00429 |
| 2005/0069202 A1* | 3/2005 | Khomo | G06K 9/222 382/186 |
| 2005/0069205 A1* | 3/2005 | Khomo | G09B 7/02 382/187 |
| 2006/0072825 A1* | 4/2006 | Hullender | G06K 9/00429 382/187 |
| 2009/0204620 A1 | 8/2009 | Thione et al. | |
| 2009/0228273 A1 | 9/2009 | Wang et al. | |
| 2010/0002936 A1* | 1/2010 | Khomo | G06K 9/222 382/187 |
| 2011/0243448 A1* | 10/2011 | Kawabuchi | G06K 9/00416 382/187 |
| 2011/0311141 A1* | 12/2011 | Gao | G06K 9/00416 382/187 |
| 2014/0363074 A1 | 12/2014 | Dolfing et al. | |
| 2020/0065601 A1* | 2/2020 | Andreassen | G06K 9/00872 |
| 2020/0379640 A1 | 12/2020 | Bellegarda et al. | |

OTHER PUBLICATIONS

Cheng et al., "Enhancing Neural Confidence-Based Segmentation for Cursive Handwriting Recognition", Proceeding of 5th International Conference on Simulated Evolution and Learning (SEAL '04), Busan, Korea, 2004, 6 pages.

Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.

Graves et al., "Connectionist Temporal Classification: Labelling Unsegmented Sequence Data with Recurrent Neural Networks", Proceedings of the 23rd International Conference on Machine Learning, Pittsburgh, PA, 2006, 8 pages.

Graves Alex, "Sequence Transduction with Recurrent Neural Networks", Proceeding of International Conference of Machine Learning (ICML) Representation Learning Workshop, Nov. 14, 2012, 9 pages.

Mikolov et al., "Recurrent Neural Network Based Language Model", Interspeech 2010, Sep. 26-30, 2010, pp. 1045-1048.

Settle et al., "End-to-End Multi-Speaker Speech Recognition", Proc. ICASSP, Apr. 2018, 6 pages.

Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.

Sundermeyer et al., "LSTM Neural Networks for Language Modeling", Interspeech 2012, Sep. 9-13, 2012, pp. 194-197.

Sutskever et al., "Sequence to Sequence Learning with Neural Networks", Proceedings of the 27th International Conference on Neural Information Processing Systems, 2014, 9 pages.

Vaswani et al., "Attention Is All You Need", 31st Conference on Neural Information Processing Systems (NIPS 2017), 2017, pp. 1-11.

Wang et al., "End-to-end Anchored Speech Recognition", Proc. ICASSP2019, May 12-17, 2019, 5 pages.

Xu et al., "Show, Attend and Tell: Neural Image Caption Generation with Visual Attention", Proceedings of the 32nd International Conference on Machine Learning, Lille, France, 2015, 10 pages.

Zhang et al., "Very Deep Convolutional Networks for End-To-End Speech Recognition", IEEE International Conference on Acoustics, Speech and Signal Processing (ICASSP), 2017, 5 pages.

* cited by examiner

SPATIAL AND TEMPORAL SEQUENCE-TO-SEQUENCE MODELING FOR HANDWRITING RECOGNITION

FIELD

The present disclosure relates generally to handwriting recognition.

BACKGROUND

Users may enter text on electronic devices using handwritten input. For example, a user may move a finger (or another apparatus) on a device display to generate handwritten input. A handwriting recognition model may then convert the handwritten input into one or more characters. Because the accuracy and efficiency of handwriting recognition can depend on the model used, improved techniques and models for recognizing handwriting are desirable.

BRIEF SUMMARY

An example process for recognizing handwritten input includes at an electronic device with one or more processors and memory: obtaining input data representing handwritten input, wherein the handwritten input is associated with a first dimension relative to the handwritten input and a second dimension relative to the handwritten input; sampling the input data to obtain a plurality of coordinates representing the handwritten input; determining, based on the plurality of coordinates, a sequence of vectors representing a respective plurality of portions of the handwritten input, where: each portion of the respective plurality of portions is associated with a respective height corresponding to the first dimension and a respective width corresponding to the second dimension, the respective height being greater than the respective width; and consecutive vectors of the sequence of vectors represent respective consecutive portions of the handwritten input; generating, using a handwriting recognition model, based on the sequence of vectors, one or more characters for the handwritten input; and causing the one or more characters to be displayed.

Determining the sequence of vectors representing a respective plurality of portions of the handwritten input and generating, using the handwriting recognition model, based on the sequence of vectors, one or more characters for the handwritten input may allow for more accurate and robust handwritten input recognition. In particular, as discussed herein, using the sequence of vectors as input to a handwriting recognition model may allow the model to accurately, efficiently, and robustly recognize handwritten input, e.g., especially handwritten input including delayed inputs. In this manner, the user-device interface is made more efficient (e.g., by quickly and accurately recognizing handwritten input, by reducing repeated handwritten inputs due to incorrect recognition, by providing a natural way for users to enter text on electronic devices), which additionally reduces power usage and improves battery life of the device by enabling the user to use the device more quickly and efficiently.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

This relates generally to recognizing handwritten input. The systems and techniques discussed herein may provide various advantages over prior systems and techniques, such as more accurate and robust recognition of handwritten input. For example, the systems and techniques discussed herein may more accurately recognize unconstrained handwriting. Unconstrained handwriting generally describes handwriting where characters (or strokes) of words are not required to be written or completed sequentially. For example, unconstrained handwriting may include delayed inputs such as returning to cross the character "t" or dot the character "i" after otherwise completing a word (common in cursive handwriting) or adding diacritical marks after otherwise completing a word. Improving recognition of unconstrained handwriting can thus improve the accuracy and efficiency of user text entry on electronic devices, as unconstrained handwriting conforms to how users may typically write, e.g., using pen and paper.

Below, FIGS. 1A-1B, 2, 3, 4A-4B, and 5A-5B provide a description of exemplary devices for performing the techniques for recognizing handwritten input. FIG. 6 illustrates an exemplary system for recognizing handwritten input.

Figure 8:
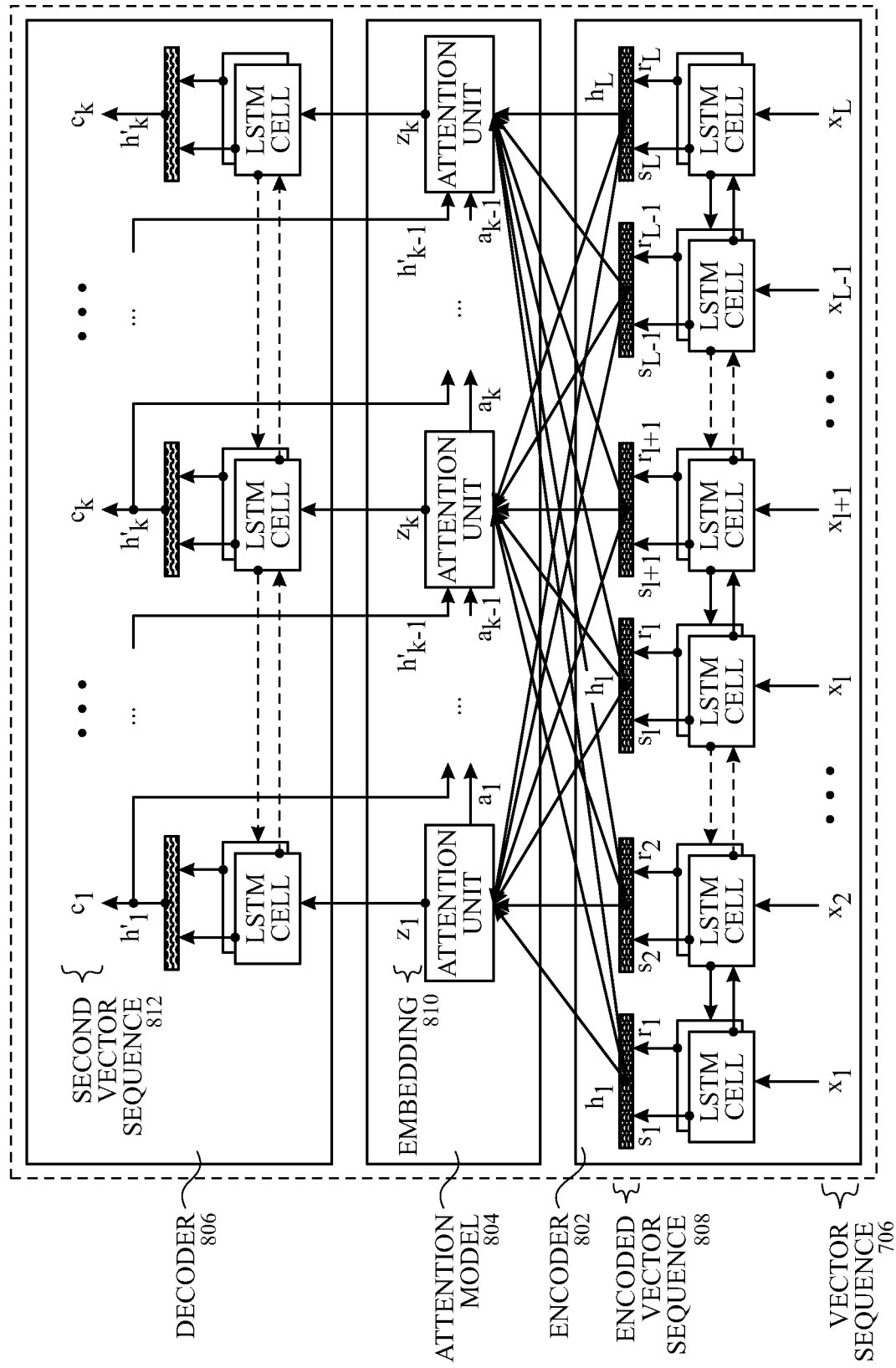
FIG. 8 illustrates an example architecture of a handwriting recognition model, according to some embodiments.
Figure 9:
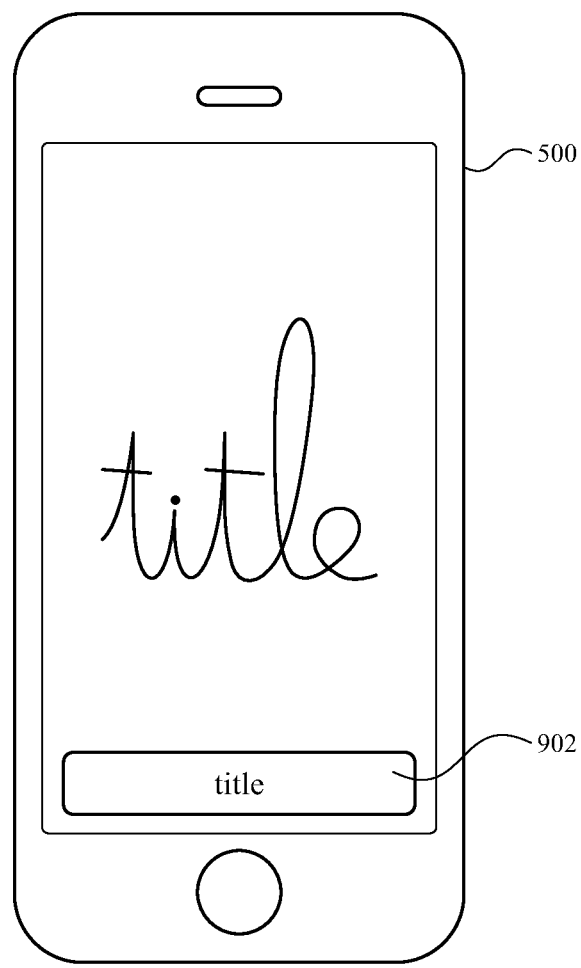
FIG. 9 illustrates handwritten input and display of recognized characters for the handwritten input at an electronic device, according to some embodiments.

FIGS. 7A-7D illustrate an exemplary process for determining a sequence of vectors representing handwritten input. FIG. 8 illustrates an example architecture of a handwriting recognition model. FIG. 9 illustrates handwritten input and display of recognized characters for the handwritten input at an electronic device. FIGS. 6, 7A-7D, 8, and 9 are used to describe the processes described below, including the process of FIGS. 10A-C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
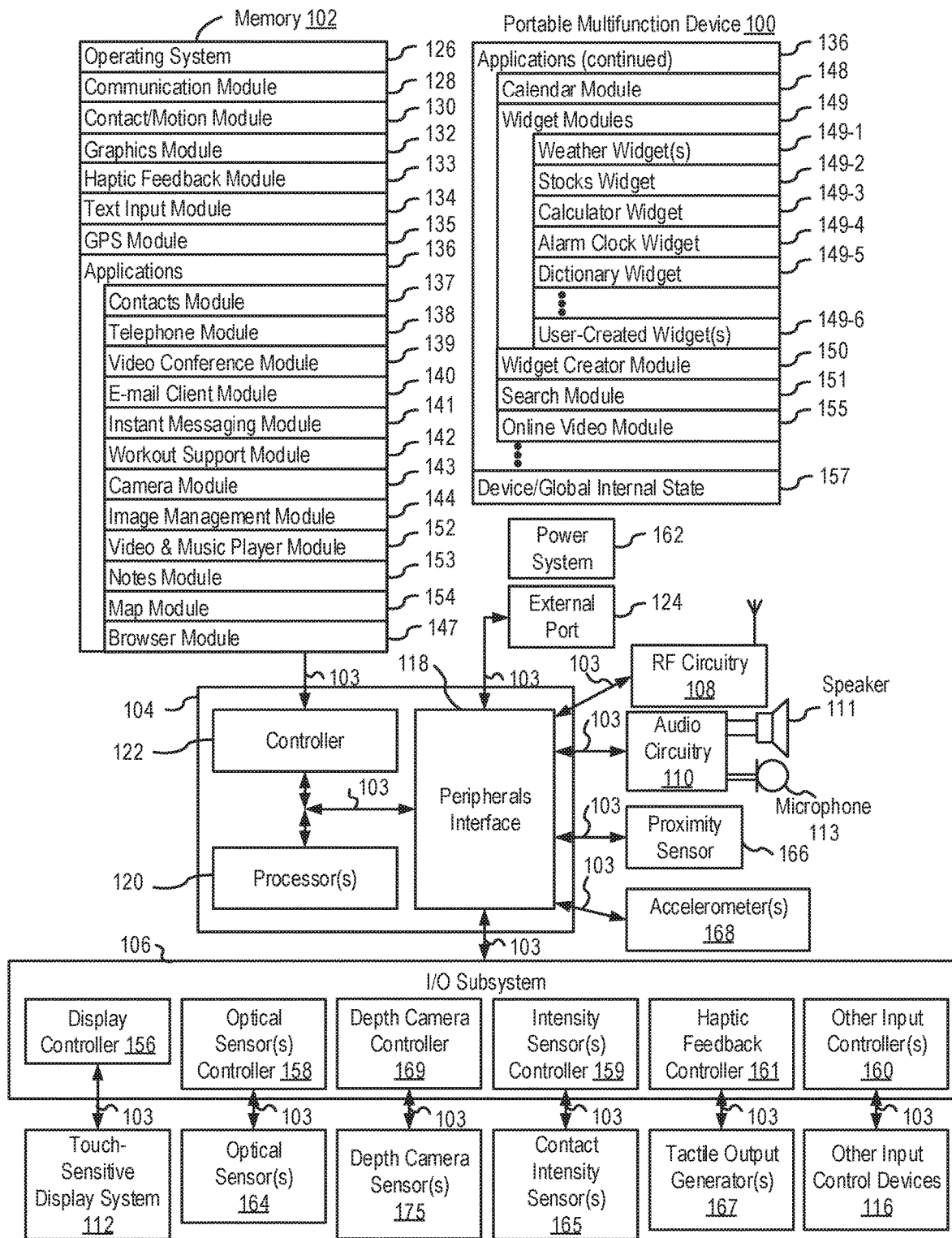
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
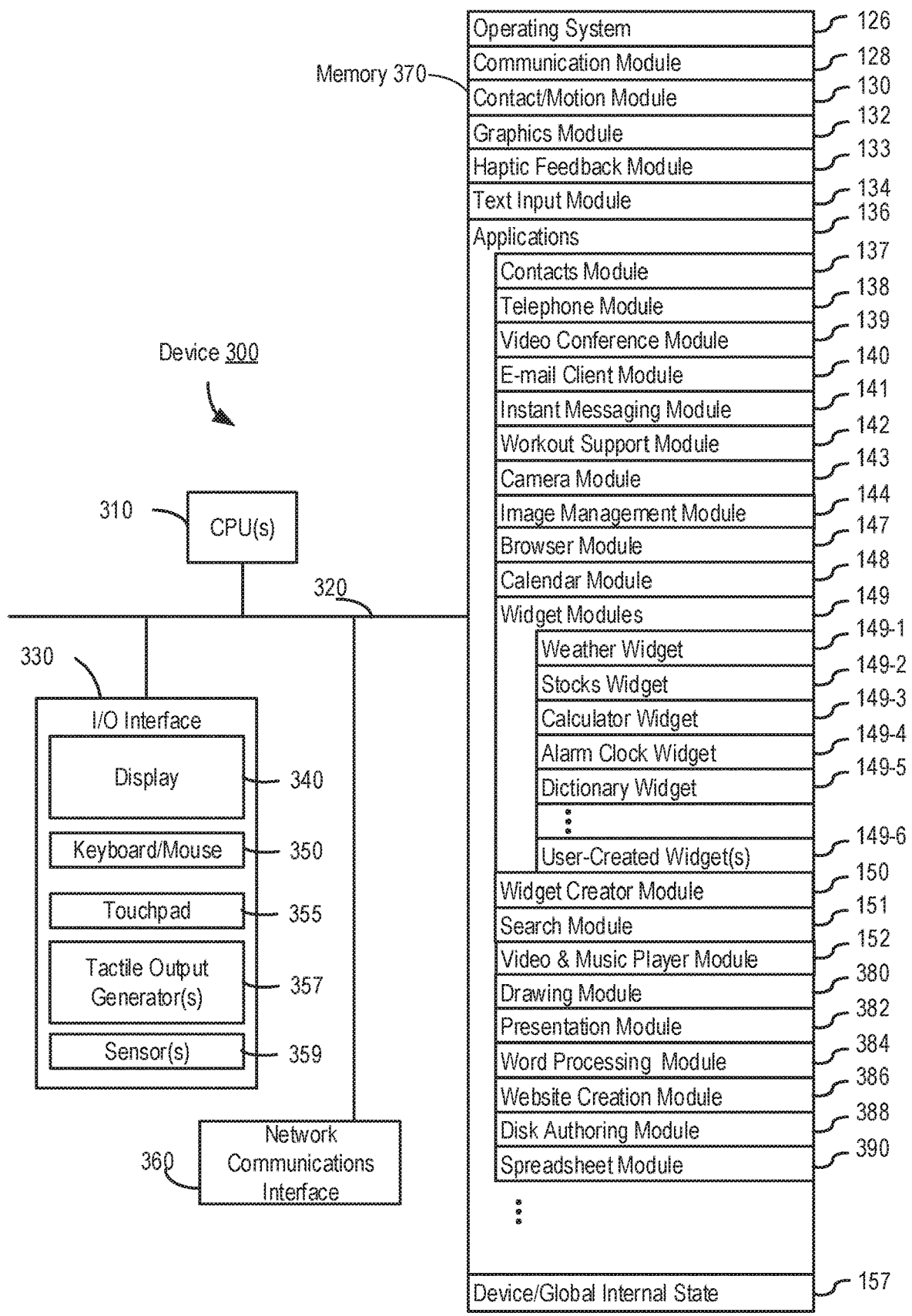
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
 Contacts module 137 (sometimes called an address book or contact list);
 Telephone module 138;
 Video conference module 139;
 E-mail client module 140;
 Instant messaging (IM) module 141;
 Workout support module 142;
 Camera module 143 for still and/or video images;
 Image management module 144;
 Video player module;
 Music player module;
 Browser module 147;
 Calendar module 148;
 Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 Widget creator module 150 for making user-created widgets 149-6;
 Search module 151;
 Video and music player module 152, which merges video player module and music player module;
 Notes module 153;
 Map module 154; and/or
 Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
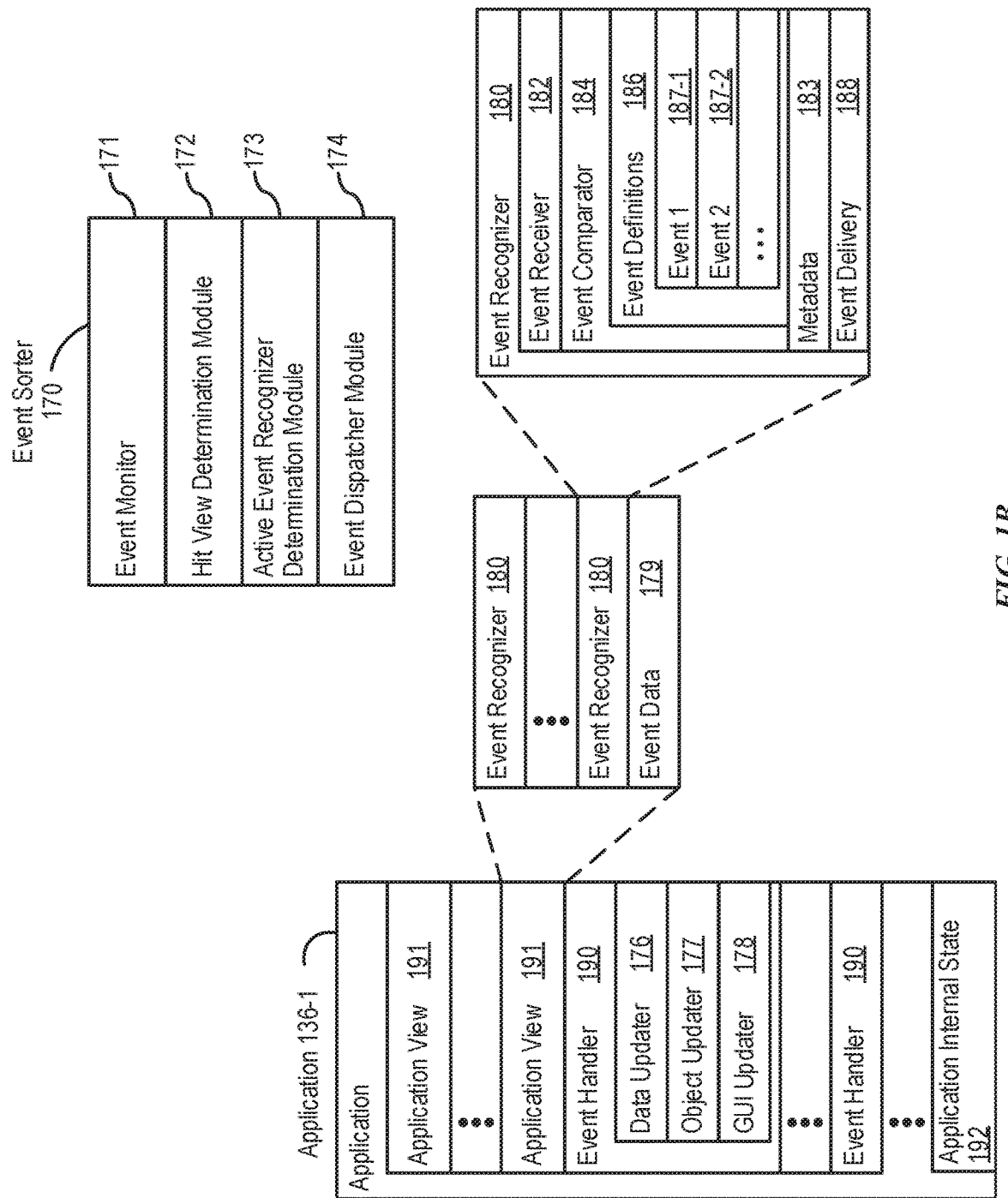
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
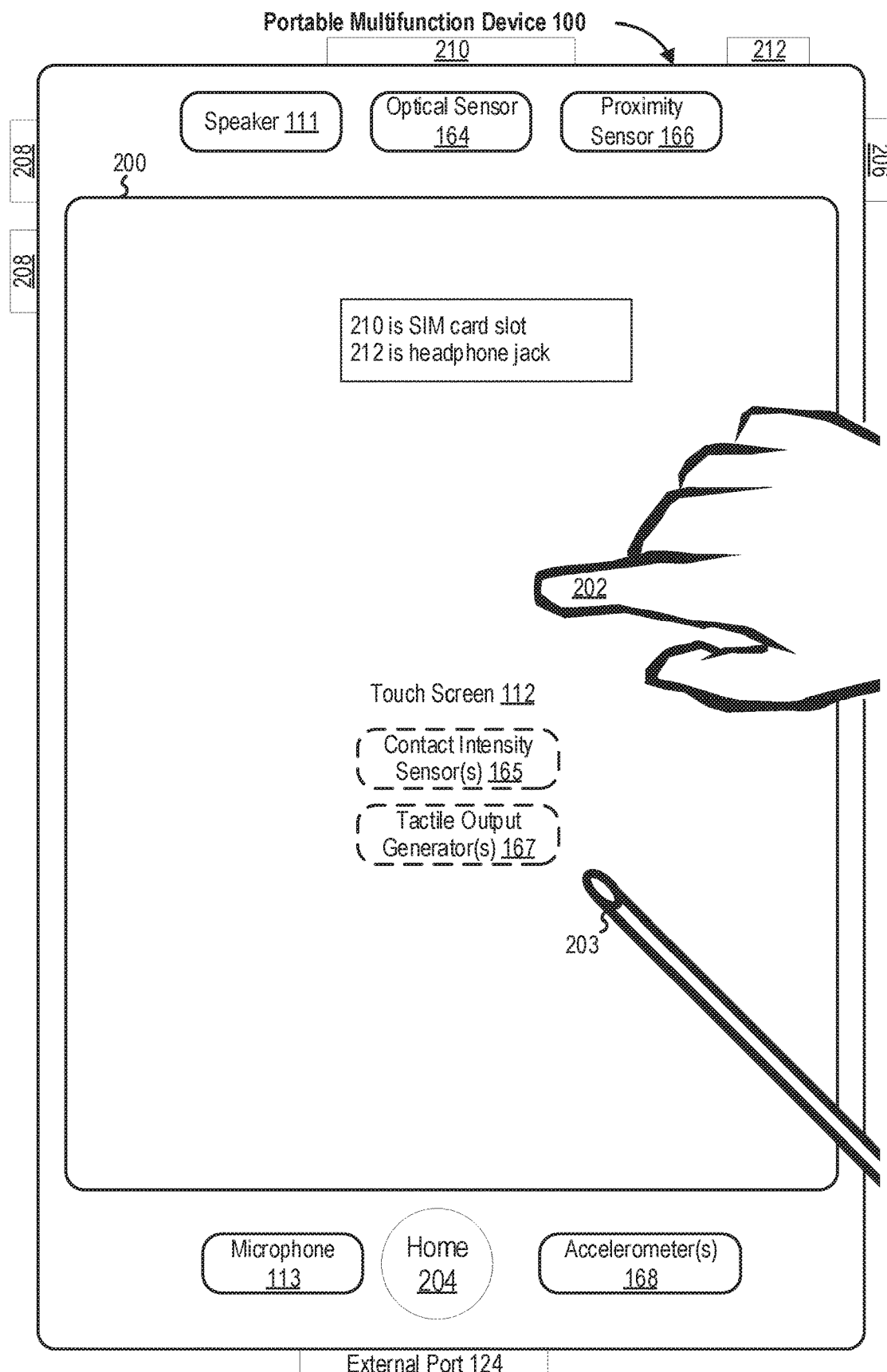
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG.

1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
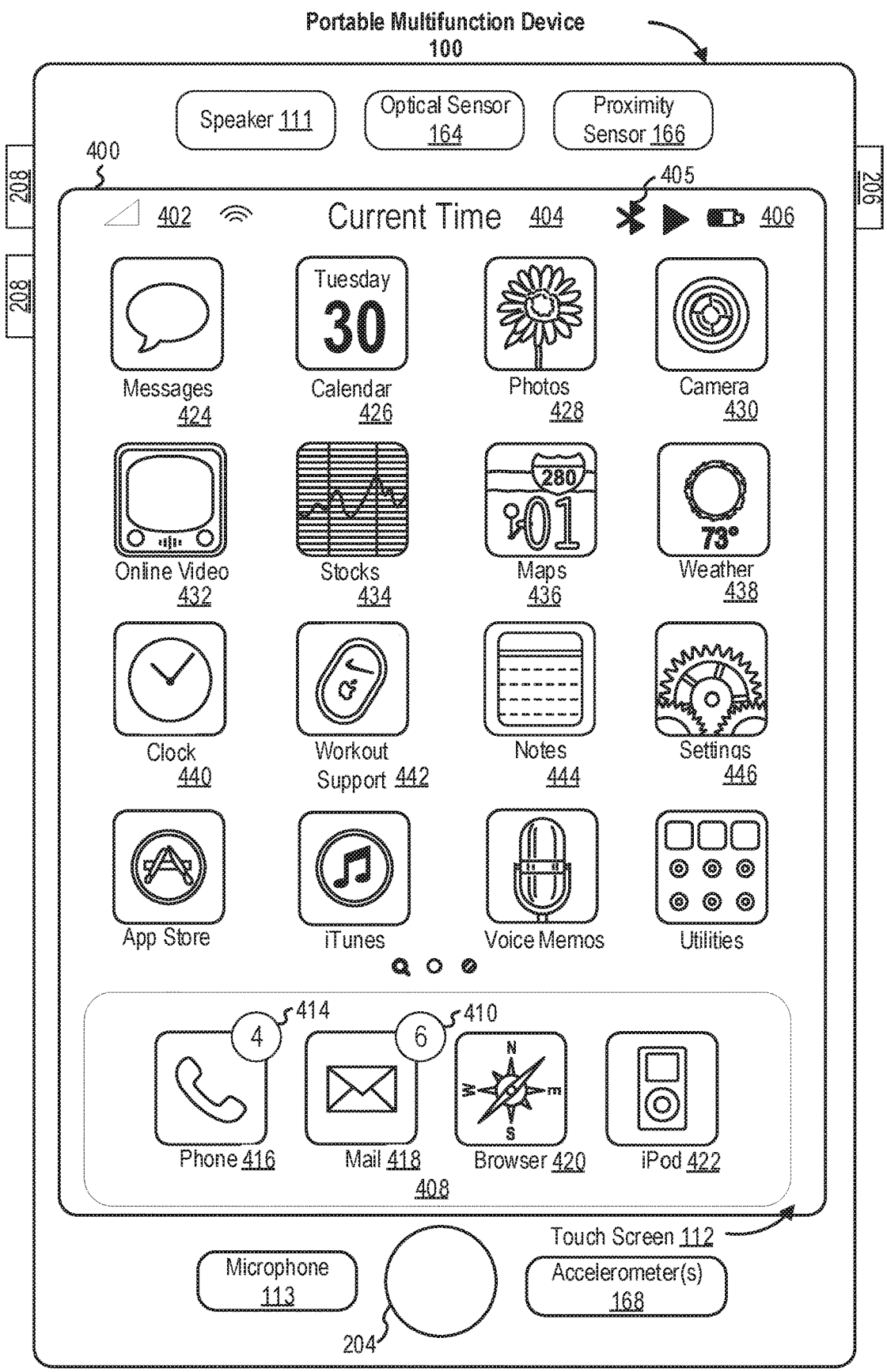
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
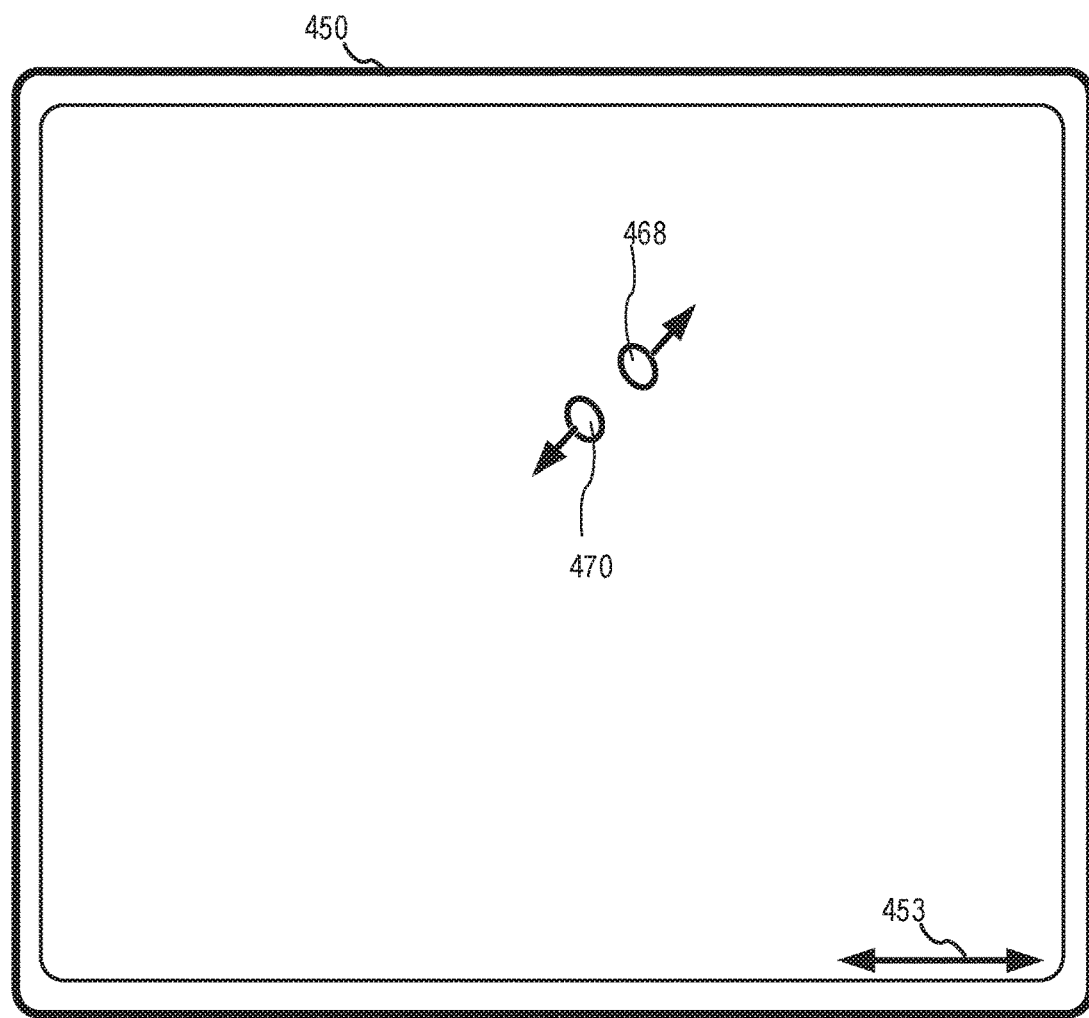
FIG. 4B illustrates an exemplary user interface for a multifunction device with a touch-sensitive surface that is separate from the display in accordance with some embodiments.
Figure 4B:
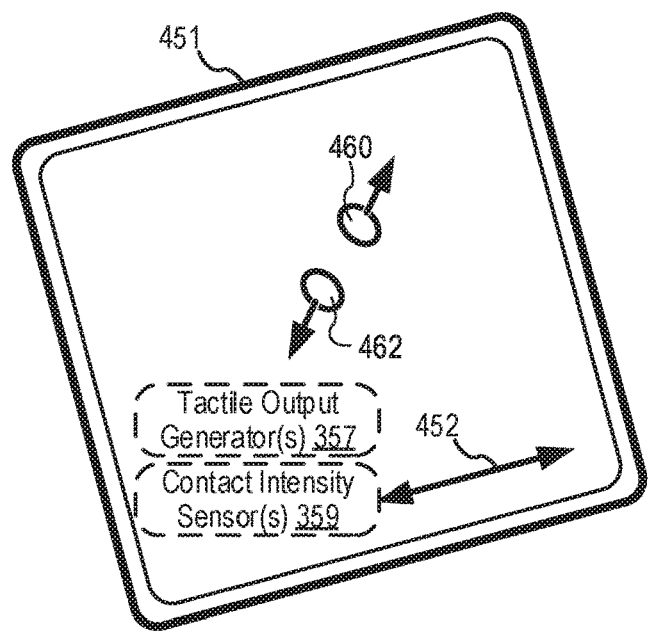

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
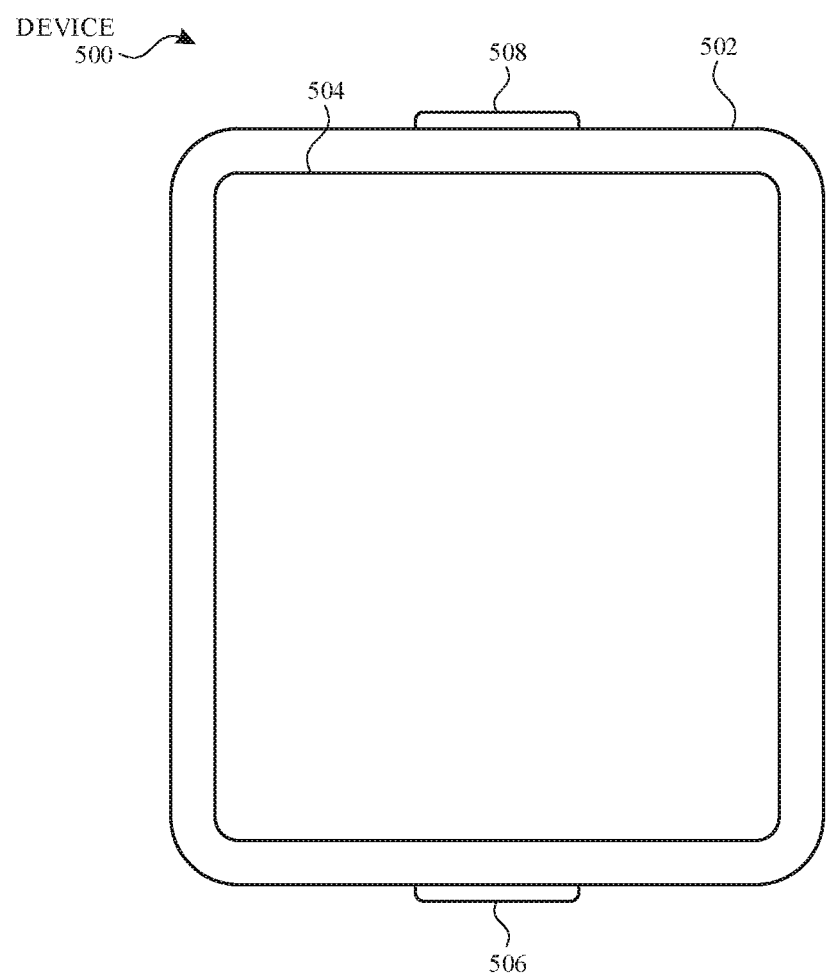
FIG. 5A illustrates a personal electronic device in accordance with some embodiments.
Figure 6:
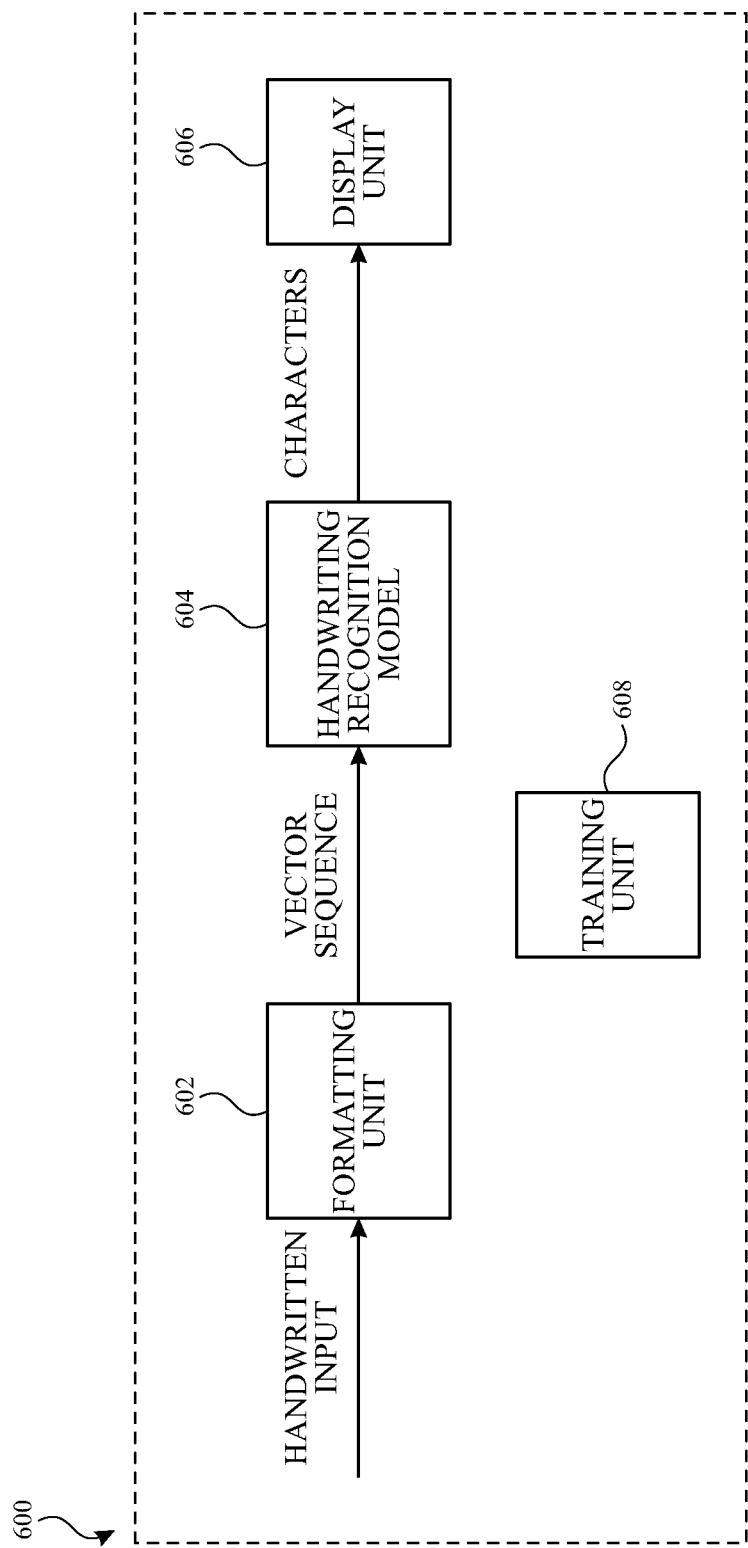
FIG. 6 illustrates a system for recognizing handwritten input, according to some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
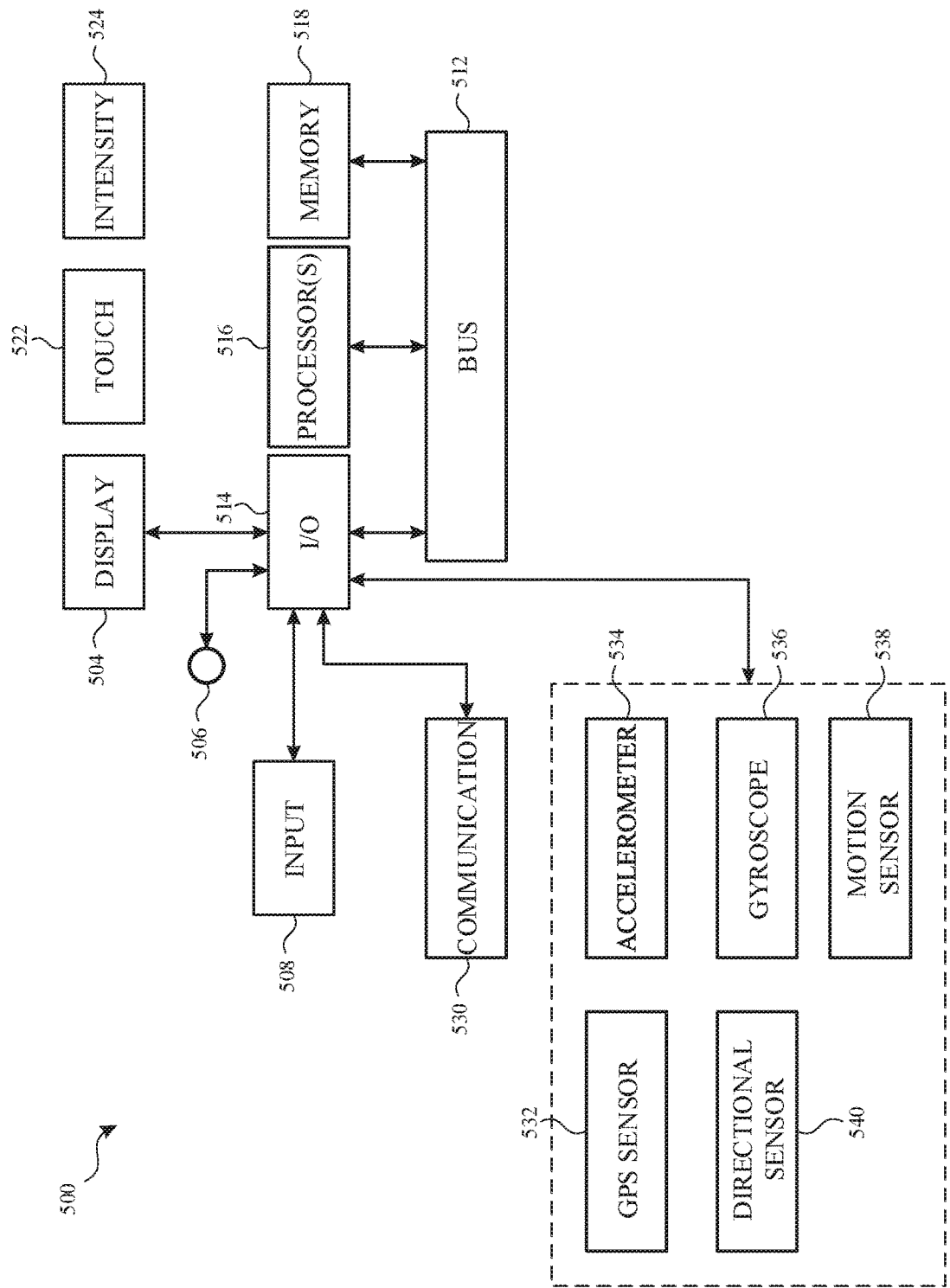
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected to communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 10A:
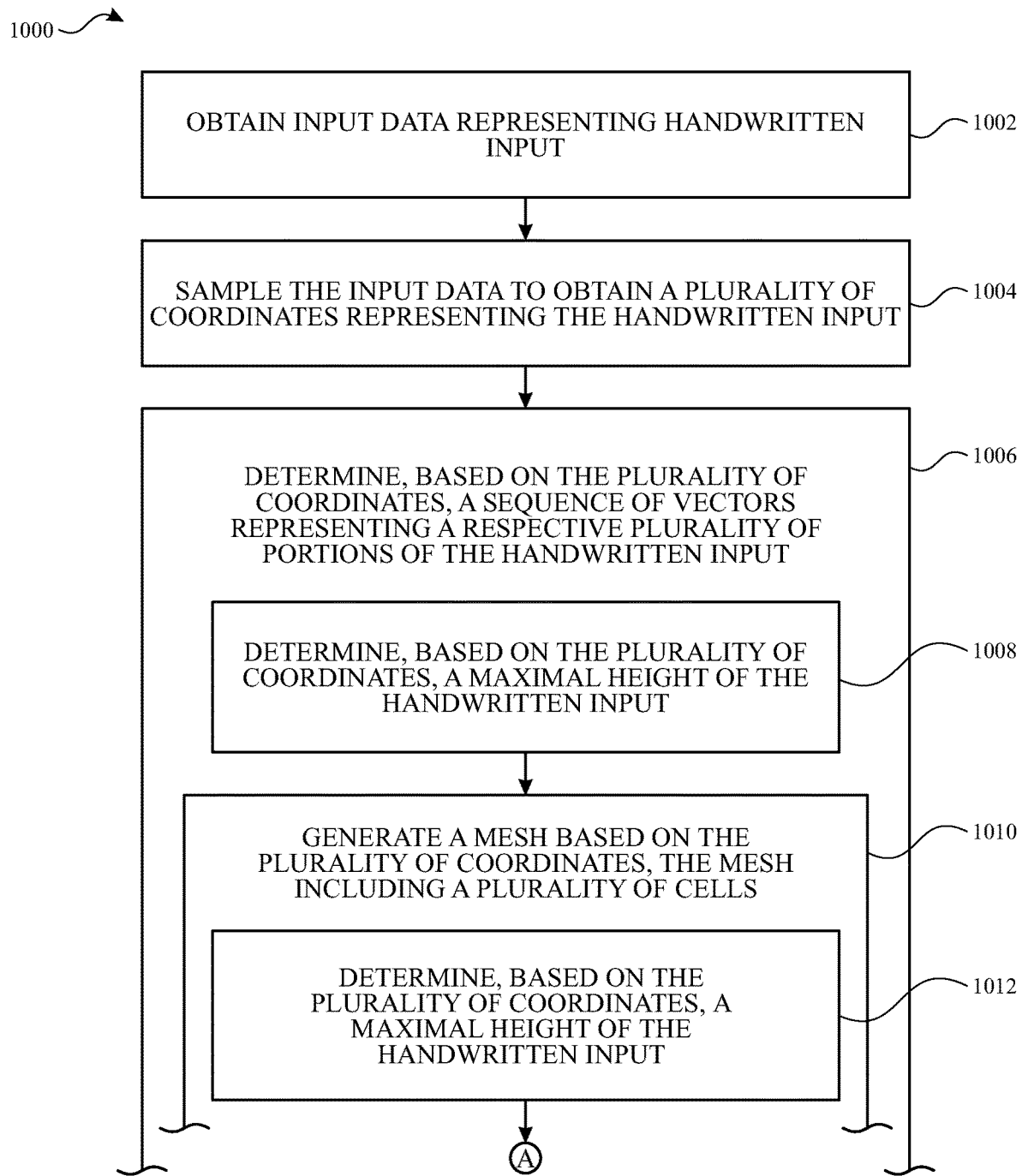
FIGS. 10A-C illustrate a flow diagram of a process for recognizing handwritten input, according to some embodiments.
Figure 10B:
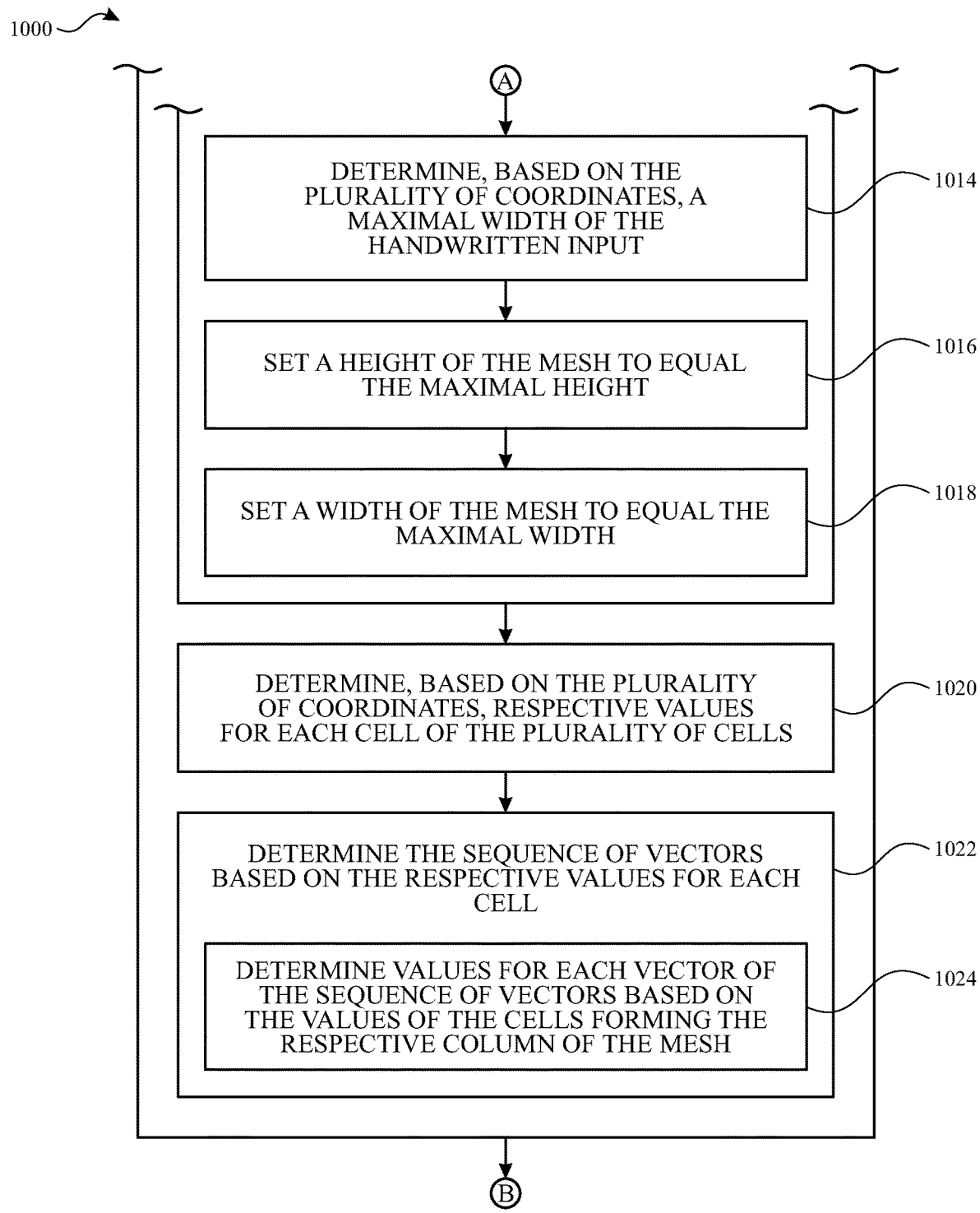
Figure 10C:
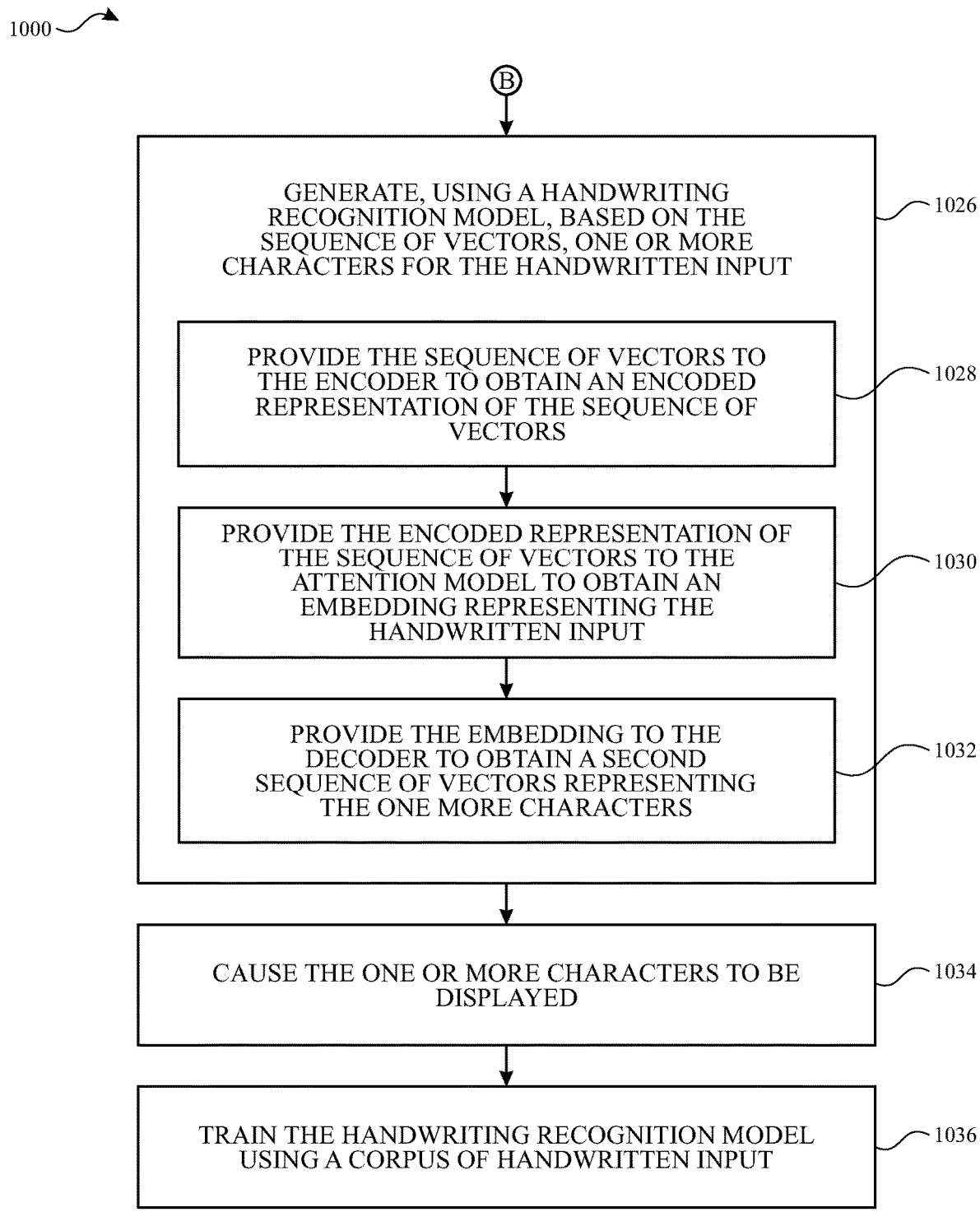

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 1000 (FIGS. 10A-C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 6 illustrates system 600 for recognizing handwritten input, according to some embodiments. In some embodiments, system 600 is implemented on one or more electronic devices (e.g., 100, 300, or 500) and the components and functions of system 600 may be distributed in any manner between the devices. In some embodiments, system 600 is implemented on one or more server devices having architectures similar to or the same as devices 100, 300, or 500 (e.g., processors, network interfaces, controllers, and memories) but with greater memory, computing, and/or processing resources than devices 100, 300, or 500. System 600 is implemented using hardware, software, or a combination of hardware and software to carry out the principles discussed herein. Further, system 600 is exemplary, and thus system 600 can have more or fewer components than shown, can combine two or more components, or can have a different configuration or arrangement of the components. Further, although the below discussion describes functions being performed at a single component of system 600, it is to be understood that such functions can be performed at other components of system 600 and that such functions can be performed at more than one component of system 600.

System 600 includes formatting unit 602. Formatting unit 602 obtains input data representing handwritten input and transforms the input data into a format (e.g., a sequence of vectors) suitable for input to handwriting recognition model 604. In some embodiments, the input data corresponds to gesture input, such as a gesture representing the handwritten input, received on a display of devices 100, 300, or 500. For example, formatting unit 602 obtains the input data based on information determined from one or more touch inputs received at device 100. In some embodiments, the input data represents a single line of the handwritten input. For example, the handwritten input does not include multiple lines of handwriting, where characters or words are above or below each other.

The input data includes various information describing the handwritten input. In some embodiments, the input data includes a set of x and y coordinates for the points forming the handwritten input. In some embodiments, each (x,y) coordinate is associated with a corresponding temporal value indicating a time at which the coordinate is input and/or a corresponding value indicating a press intensity associated with the coordinate. In some embodiments, the input data also includes such temporal values and/or such values indicating press intensities.

The handwritten input is associated with a first dimension relative to the handwritten input and a second dimension relative to the handwritten input. In some embodiments, the first and second dimensions are defined by a mesh generated based on the handwritten input, described below with respect to FIGS. 7A-D. For example, the first dimension may be a vertical dimension (e.g., top to bottom) relative to the handwritten input and the second dimension may be a horizontal dimension (e.g., left to right) relative to the handwritten input. However, the first and second dimensions are not limited to respective vertical and horizontal dimensions. In particular, in some embodiments, the first and second dimensions may be chosen to describe the shape of the handwritten input (e.g., curved input, slanted input) and thus be oriented relative to each other in any two-dimensional manner, e.g., as shown in FIGS. 7C-D.

In some embodiments, the handwritten input includes delayed input associated with one or more characters of the handwritten input. Delayed input describes non-sequential input when completing a handwritten character or word. For example, delayed input includes returning to dot the character "i" or cross the character "t" of an otherwise complete word, returning to fill in missing character(s) or stroke(s) of an otherwise complete word, returning to correct an already written character or stroke (e.g., to write it neater, to correct a defect), returning to add accents or diacritical marks to an otherwise complete word, and inputting a stroke for a word (e.g., Chinese character) in an atypical order.

In some embodiments, formatting unit 602 samples the input data to obtain a plurality of coordinates representing the handwritten input. For example, formatting unit 602 samples the set of (x,y) coordinates representing the handwritten input to obtain the plurality of coordinates, e.g., a smaller set of (x,y) coordinates. In some embodiments, formatting unit 602 performs a spatial sampling, e.g., such that a smaller set of (x,y) coordinates are randomly drawn from the larger set of (x,y) coordinates. In some embodiments, formatting unit 602 performs a temporal sampling, e.g., such that the (x,y, t) (t representing time) coordinates are sampled along the temporal axis.

In some embodiments, formatting unit 602 determines, based on the plurality of coordinates, a sequence of vectors representing a respective plurality of portions of the handwritten input. FIGS. 7A-D illustrate a process formatting unit 602 uses to determine the sequence of vectors, according to some embodiments.

Figure 7A:
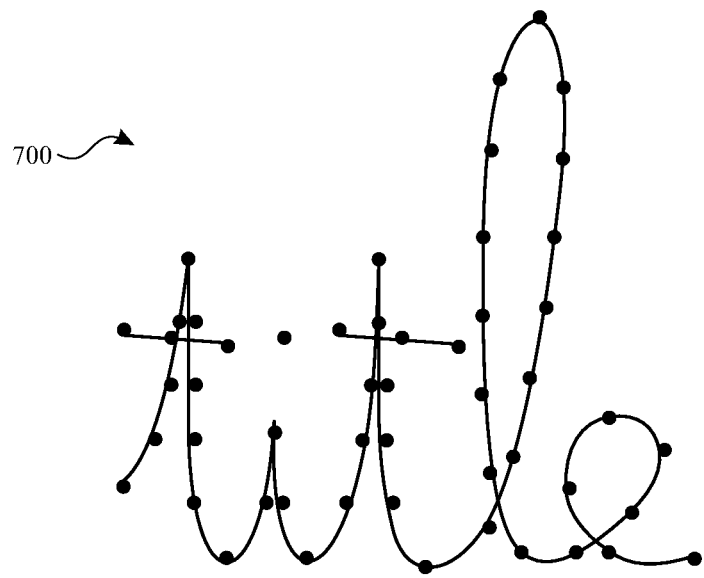
FIGS. 7A-D illustrate a process for determining a sequence of vectors representing handwritten input, according to some embodiments.

FIG. 7A illustrates example handwritten input 700 for the word "title." As shown, a plurality of coordinates (e.g., coordinates sampled by formatting unit 602) represent the handwritten input. In some embodiments, handwritten input 700 includes delayed input, such as the dot on the "i" and the crosses on the "t's".

Figure 7B:
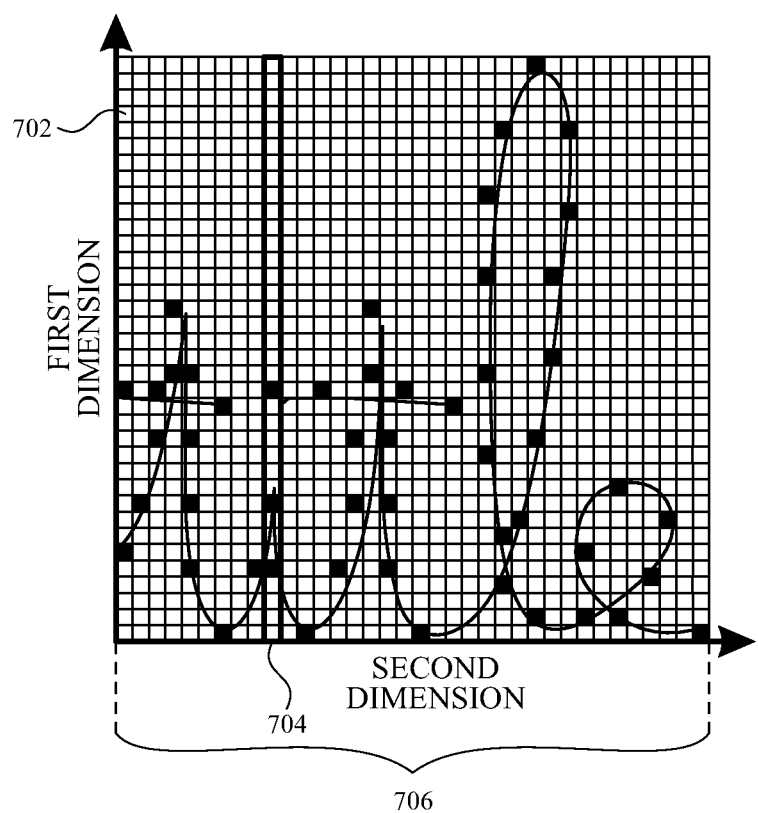
Figure 7C:
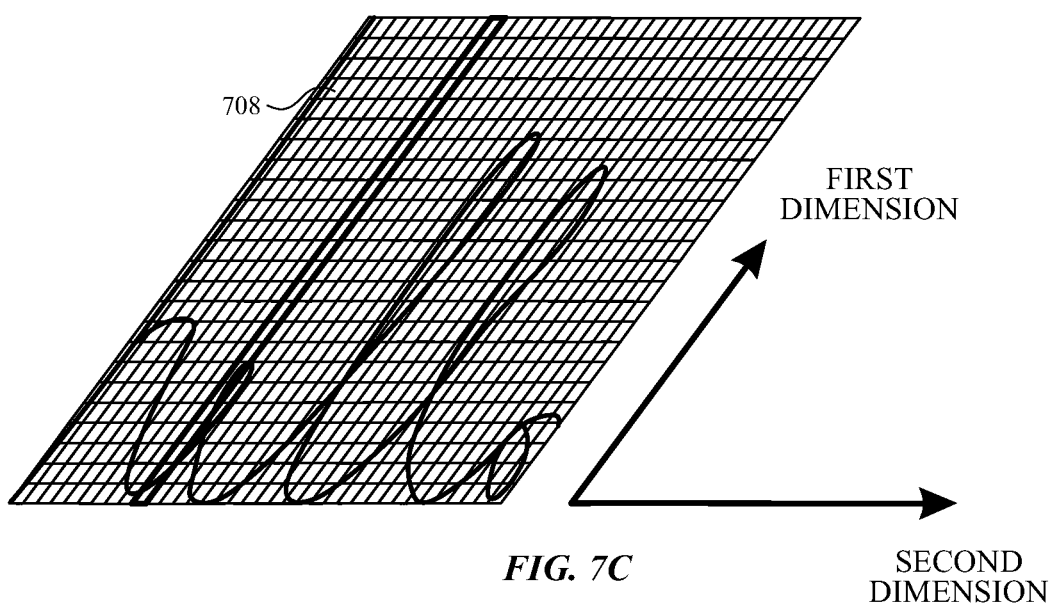
Figure 7D:
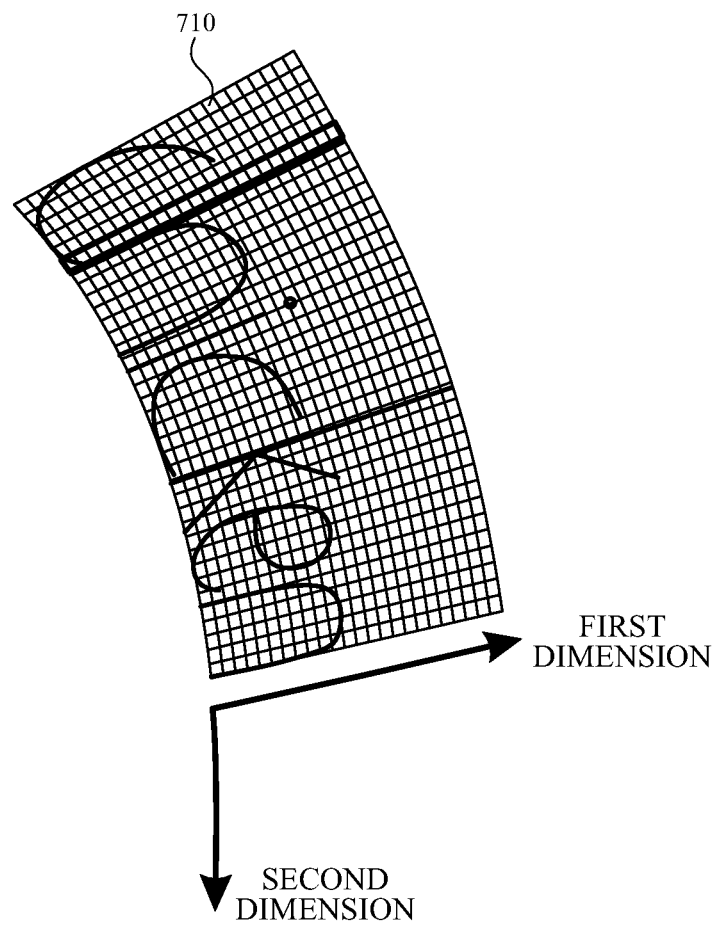

FIG. 7B illustrates mesh 702 generated by formatting unit 602 based on the plurality of coordinates. In some embodiments, to generate a mesh for handwritten input, formatting unit 602 determines, based on the plurality of coordinates, a type of mesh that approximately matches a shape of the handwritten input, or chooses a predetermined mesh type (e.g., a rectangular mesh). For example, rectangular mesh 702 may approximately match the shape of handwritten input 700, as handwritten input 700 does not include substantial slanting or curvature. As another example, FIG. 7C illustrates mesh 708 generated based on the handwritten input "hello." Mesh 708 has the shape of a parallelogram, as the handwritten input "hello" has a slanted shape. As yet another example, FIG. 7D illustrates mesh 710 generated based on the handwritten input "chicken." Mesh 710 is a curved mesh, as the handwritten input "chicken" has a curved shape. It should be appreciated that the mesh types illustrated in FIGS. 7B-D are merely exemplary, and that various mesh shapes (and mesh cell shapes) may be employed depending on the approximate shape of the handwritten input.

In some embodiments, as shown in FIGS. 7B-D, a generated mesh defines the first and second dimensions relative to the handwritten input. For example, in FIG. 7B, the first and second dimensions are respectively vertical and horizontal dimensions. In other examples, e.g., as shown in FIGS. 7C-D, the first and second dimensions are not respectively vertical and horizontal, but instead may be general dimensions describing the mesh and handwritten input.

In some embodiments, formatting unit 602 generates a mesh by determining a maximal height of the handwritten input (along the first dimension) and by determining a maximal width of the handwritten input (along the second dimension). For example, formatting unit 602 determines the maximal height by calculating the distance between the maximum and minimum coordinates of the plurality of coordinates along the first dimension (e.g., between the maximum and minimum y coordinates in FIG. 7B). Similarly, formatting unit 602 may determine the maximal width by calculating the distance between the maximum and minimum coordinates of the plurality of coordinates along the second dimension (e.g., between the maximum and minimum x coordinates in FIG. 7B). In some embodiments, formatting unit 602 then sets a height of the mesh to equal the maximal height and sets a width of the mesh to equal the maximal width. In this manner, meshes generated by formatting unit 602 may overlap the entirety of the handwritten inputs, as shown in FIGS. 7B-D.

In view of the above, it should be appreciated that the "heights" and "widths" of handwritten input and meshes are not limited to vertical and horizontal measurements of height and width, respectively. Rather the "heights" and "widths" of handwritten input and meshes may describe respective values indicating the size of the handwritten input (or mesh) along the first and second dimensions, respectively.

In some embodiments, formatting unit 602 determines, based on the plurality of coordinates, respective values for each cell of a mesh. In some embodiments, to determine the cell values, formatting unit 602 sets the value of a cell to 1 if a coordinate falls within the cell, and sets a value of a cell to 0 if no coordinate falls within the cell. For example, each shaded cell of mesh 702 has at least one coordinate falling within it and thus has a value of 1. In other embodiments, formatting unit 602 may count the number of coordinates failing within each cell, and then normalize the count using the total number of coordinates to calculate an "intensity" value for each cell. The latter approach may be desirable when a mesh is coarse, e.g., has many coordinates falling within particular cells, and/or when the plurality of coordinates includes a large number of coordinates relative to the number of cells.

In some embodiments, formatting unit 602 then determines a sequence of vectors (e.g., vector sequence 706) based on the determined values of each cell of a mesh. For example, each vector of the sequence of vectors 706 corresponds to a respective column of mesh 702. A column of a mesh describes a line of mesh cells along the first dimension, e.g., as shown by the bolded columns in FIGS. 7B-D. Formatting unit 602 sets the respective values of a vector to equal the respective values of the cells forming the column corresponding to the vector. For example, vector 704 of sequence of vectors 706 has n values, where n is the number of cells of mesh 702 along the first dimension. Vector 704 includes, for instance, three values of 1 (representing the "i" of "title") and n−3 values of 0. In this manner, each vector of the determined sequence of vectors may be an n-dimensional vector and the sequence of vectors includes m vectors, where m is the number of cells of the corresponding mesh along the second dimension.

Each vector of the sequence of vectors represents a respective portion of the handwritten input. For example, as shown in FIGS. 7B-D, each respective portion is associated with a respective height (along the first dimension) and a respective width (along the second dimension) less than the respective height. Thus, each vector may represent a slice of the handwritten input along the first dimension. As further shown in FIGS. 7B-D, in some embodiments, each respective portion is associated with a same respective spatial area. As described above, the spatial area may depend on the mesh generated for the handwritten input. For example, the spatial area in FIG. 7B is associated with a rectangle, the spatial area in FIG. 7C is associated with a parallelogram, and the spatial area in FIG. 7D is associated with a curved area.

As further shown in FIGS. 7B-D, consecutive vectors of the determined sequence of vectors represent respective consecutive portions (e.g., areas) of the handwritten input. In some embodiments, each portion of the plurality of portions has the same height (e.g., the height of the corresponding mesh along the first dimension) and the same width.

The determined sequence of vectors includes both spatial and temporal information about the handwritten input. For example, the order of the vectors can indicate temporal information, such as the order in which characters (or portions thereof) are written. For example, because a first vector of sequence of vectors 706 may represent the "t" in "title" (or a portion thereof) and a subsequent vector of the sequence of vectors 706 may represent the "i" in "title" (or a portion thereof) sequence of vectors 706 can indicate that "t" is written before "i." Further, the values of each vector of sequence of vectors 706 can indicate the spatial information, e.g., the spatial coordinates forming the handwritten input.

Including both spatial and temporal information in representations of handwritten input (e.g., prior to recognition of the input) may yield more accurate and robust recognition compared to prior techniques for recognizing handwritten input. For example, prior techniques for recognizing handwritten input may rely primarily on spatial information (e.g., recognizing based on an input set of points forming an image of the handwriting) or may rely primarily on temporal information (e.g., recognizing based on a temporally ordered input stream of (x,y, t) coordinates forming the handwriting). As such, the prior techniques may not effectively utilize both spatial and temporal information as the systems and techniques discussed herein, which may lead to less accurate and efficient handwritten input recognition.

Further, representing handwritten input using sequence of vectors 706 may allow for more accurate and robust recognition of handwritten input including delayed input. For example, to account for delayed inputs, prior handwriting recognition models may have to learn many possible orderings of delayed inputs for a particular word, e.g., the many possible orders in which t's may be crossed and i's dotted, the many possible orders in which accents/diacritical marks may be added to a word, the many possible orders/ways in which characters may be inserted or corrected to form a new word, the many possible orders in which strokes can be input to form a word (e.g., Chinese character), and so on. Given the large number of possible orders, such prior models may be computationally intractable (and it may be infeasible to collect enough training data representing all these possible orders), leading to less accurate and robust handwriting recognition. In contrast, the systems and techniques discussed herein may not require learning of the possible orders of delayed inputs, as vector(s) of the determined sequence of vectors may already represent the relationship between delayed inputs and their respective proper characters (or respective proper positions in a word). For example, vector 704 represents both delayed input (e.g., the dot on the "i" is written after "title" is otherwise complete) and the proper associated character (the stem of the "i"). In this manner, delayed inputs may be associated with a correct character (or correct position in a word) prior to recognition, reducing the need to learn many possible orderings of delayed input.

More generally, in some embodiments, a first part of the handwritten input (e.g., the delayed input) is written after a second part of the handwritten input. For example, in FIG. 7B, the dot on the "i" in "title" is written after the stem of the "i." A single vector (e.g., vector 704) of the determined sequence of vectors represents both the first part and the second part. In some embodiments, the first part and the second part each represent respective portions of the same character, e.g., the dot and stem of an "i," or a character and a corresponding diacritical mark. In some embodiments, the first part represents a correction of the second part. For example, the first part includes an input (e.g., a scribble or strikeout) to remove the second part (e.g., an incorrect character, or portion thereof) and a correct letter (or portion thereof) for the second part. As another example, the first part (e.g., a completion of the loop for the character "o") represents a completion or modification of the second part (e.g., an "o" with an incomplete loop).

In some embodiments, after formatting unit 602 transforms input data representing handwritten input into a sequence of vectors, formatting unit 602 inputs the sequence of vectors into handwriting recognition model 604. Handwriting recognition model 604 generates, based on the input sequence of vectors, one or more characters for the handwritten input, e.g., recognizes the handwritten input.

In some embodiments, handwriting recognition model 604 includes a sequence-to-sequence model, e.g., a recurrent neural network (RNN) encoder-decoder model. In some embodiments, a sequence-to-sequence model maps a variable length input sequence (e.g., sequence of vectors 706) to a variable length output sequence (e.g., one or more characters). Sequence-to-sequence models may not require specifying an alignment between input and output sequences. In particular, as discussed below, by recognizing handwriting as a sequence of vectors representing consecutive portions of the handwriting, a sequence-to-sequence model may implicitly determine (e.g., learn) the appropriate alignment information. Thus, recognizing handwriting using the techniques discussed herein may differ from prior techniques that segment handwritten input into individual characters and that require explicitly specifying an alignment between each segment and a corresponding character (e.g., techniques that recognize one handwritten character at a time).

FIG. 8 illustrates an example architecture of handwriting recognition model 604, according to some embodiments.

In some embodiments, handwriting recognition model 604 includes encoder 802. Encoder 802 accepts a sequence of vectors (e.g., 706) as input and outputs encoded representation of the sequence of vectors 808. In some embodiments, encoder 802 includes one or more bi-directional RNNs. In some examples, the nodes of the RNN(s), such as the hidden nodes, are implemented as long short-term memory (LSTM) cells. Although FIG. 8 shows two layers of LSTM cells for encoder 802, each LSTM cell may be extended to form a deeper network, and thus any number of LSTM layers/cells may be employed in encoder 802.

In some embodiments, encoded representation of the sequence of vectors 808 includes the hidden node activations of encoder 802. In some embodiments, to compute the hidden node activations at time step $l(h_l)$ from the input sequence of vectors 706, $X=\{x_l\}$, encoder 802 computes:

$$s_l = T\{W_{SF} \cdot x_l + W_{SS} \cdot s_{l-1}\} \qquad (1)$$

$$r_l = T\{W_{RF} \cdot x_l + W_{RR} \cdot r_{l+1}\} \qquad (2)$$

where the H-dimensional vector $s_{l-1}$ includes the internal representation of context obtained from the outputs of the hidden layers from a previous time step, the H-dimensional vector $r_{l+1}$ includes the internal representation of context obtained from the outputs of the hidden layers from a future time step, the matrices W.. are suitable weight matrices of compatible dimensions, and $T\{\bullet\}$ denotes an activation function, such as a sigmoid, hyperbolic tangent, or rectified linear unit. In some embodiments, the overall hidden state activations $h_l$ at time step l is obtained by concatenating $s_l$ and $r_l$: $h_l=[s_l \ r_l]$, of dimension 2H.

In some embodiments, handwriting recognition model 604 includes attention model 804. Attention model 804 accepts encoded representation of the sequence of vectors 808 as input and outputs embedding 810 representing the handwritten input. In some embodiments, to compute embedding 810 ($z_k$) at time step k, attention model 804 computes a weighted sum of the hidden node activations $h_l$:

$$z_k = \Sigma_{l=1}^{L} \alpha_{k,l} \cdot h_l \qquad (3)$$

where $a_k=[\alpha_{k,1} \ldots \alpha_{k,L}]$ is the attention probability vector (alignment vector) at time step k.

In this manner, in some embodiments, attention model 604 determines information representing an alignment (e.g., $a_k$) between the plurality of portions of the handwritten input and a state of the handwriting recognition model, e.g., the hidden states h of encoder 802 and the hidden states h' of decoder 806 (discussed below). For example, the alignment vector $a_k$ may indicate which portion of the input vector sequence 706 decoder 806 should focus on when decoding a particular character. For example, the alignment vector may indicate that when decoding the character "t" of "title," decoder 806 should focus on (e.g., give more weight to) the first few hidden states of the encoder that correspond to the vector representation of "t" in "title." Similarly, the alignment vector may indicate that when decoding the character "e" of "title," decoder 806 should focus on the last few hidden states of the encoder that correspond to the vector representation of "e" in "title." In this manner, sequence-to-sequence models including attention may implicitly determine the appropriate alignment information, without additional user input or annotation (besides the input vector sequence 706) explicitly specifying the alignment information.

In some embodiments, attention model 804 computes each element $\alpha_{k,l}$ of the alignment vector $a_k$ according to:

$$\alpha_{k,l} = \frac{\exp(e_{k,l})}{\sum_{l'=1}^{L} \exp e_{k,l'}}, l=1, \ldots, L. \quad (4)$$

Techniques for computing $e_{k,l}$ are now discussed.

In some embodiments, attention model 804 has positional awareness by considering the alignment $a_{k-1}$ from a previous output time step. Computing $e_{k,l}$ to include positional awareness may include first computing multiple vectors $v_{k,l}$ for each position l of the previous alignment $a_{k-1}$ by convolving the previous alignment with a weight matrix F according to:

$$v_{k,l} = \Sigma_{l'=l-\lambda}^{l+\lambda} F_{l-l'} \alpha_{k-1,l'} \quad (5)$$

where $\lambda$ controls the size of the attention window $2\lambda+1$ around position l. Attention model 804 may then compute $e_{k,l}$ according to:

$$e_{k,l} = w^T \cdot T\{W_{NH} \cdot h_{k-1}' + W_{EH} \cdot h_l + W_{EV} \cdot v_{k,l}\}, l=1, \ldots, L, \quad (6)$$

where the weight vector w and the weight matrices W.. have compatible dimensions, and where the activation function T may be a hyperbolic tangent. FIG. 8 and equation (5) show that attention model 804 may use the previous alignment $a_{k-1}$ when computing a current alignment $a_k$. FIG. 8 and equation (6) show that computing the current alignment $a_k$ may rely on the state of decoder 806, e.g., the hidden node activations {h'} of decoder 806, now discussed below.

In some embodiments, handwriting recognition model 604 includes decoder 806. Decoder 806 accepts embedding 810 as input and outputs second sequence of vectors 812 representing one or more characters for the handwritten input. For example, each vector of second sequence of vectors 812 represents a respective character of the one or more characters. For example, for the handwritten word "title," decoder 806 may output five sequential vectors, where each vector represents a respective sequential character of "title."

In some embodiments, a size of each vector of second sequence of vectors 812 is associated with a size of a character inventory (e.g., the number of characters in the inventory) available to handwriting recognition model 604. In some embodiments, the character inventory includes the characters handwriting recognition model 604 is capable of recognizing, e.g., uppercase and lowercase letters, diacritical marks, punctuation marks, symbols such as @, ©, €, characters in languages other than English (e.g., Chinese, Japanese, and Korean characters), Unicode characters, and the like.

In some embodiments, decoder 806 includes one or more bi-directional RNNs. In some embodiments, the nodes of the RNN(s), such as the hidden nodes, are implemented as LSTM cells. Although FIG. 8 shows two layers of LSTM cells for decoder 806, each LSTM cell may be extended to form a deeper network, and thus any number of LSTM layers/cells may be employed in decoder 806.

In some embodiments, to compute second sequence of vectors 812 representing the one or more characters for the handwritten input, decoder 806 first computes its hidden node activations at a current time step k based on embedding 810 according to:

$$s_k' = T\{W_{SZ} \cdot z_k + W_{NS} \cdot s_{k-1}'\} \quad (7)$$

$$r_k' = T\{W_{RZ} \cdot z_k + W_{NR} \cdot r_{k+1}'\}, \quad (8)$$

where the weight matrices W.. have compatible dimensions, and the activation function T may be a sigmoid, hyperbolic tangent, or rectified linear unit. In some embodiments, decoder 806 then computes its overall hidden node activations $h_k'$ at time step k by concatenating $s_k'$ and $r_k'$ according to: $h'_k = [s_k' r_k']$. In some embodiments, decoder 806 then outputs second sequence of vectors 812 ($C_k$) by computing:

$$c_k = S\{W_{CH} \cdot h_k'\}, \quad (9)$$

where $W_{CH}$ is a weight matrix of compatible dimension, and S denotes the softmax activation function. As discussed, each vector $C_k$ may be M-dimensional, where M is the size of the character inventory available to handwriting recognition model 604. In this manner, handwriting recognition model 604 generates, based on sequence of vectors 706, one or more characters for the handwritten input.

Returning to FIG. 6, system 600 includes display unit 606. Display unit 606 causes the one or more characters representing the handwritten input to be displayed. FIG. 9 illustrates handwritten input and display of recognized characters for the handwritten input at an electronic device, according to some embodiments. For example, FIG. 9 shows the handwritten input "title" at a display of device 500. Device 500 recognizes the handwritten input according to the techniques discussed herein, and causes the recognized characters "title" to be displayed in display area 902. In some embodiments, a user selects display area 902 to cause input of the corresponding recognized character(s), e.g., input as text into a document or message the user is composing.

In some embodiments, system 600 includes training unit 608. Training unit 608 trains handwriting recognition model 604 to optimally recognize handwritten input. In some examples, training unit 608 includes a corpus of handwritten input and trains handwriting recognition model using the corpus. In some embodiments, the corpus includes a plurality of samples of handwritten input for respective sequences of characters (e.g., handwritten input samples and correct character(s) for each of the respective handwritten input samples).

In some embodiments, training handwriting recognition model 604 includes optimizing a loss function, e.g., minimizing the loss function at each training iteration. In some embodiments, the loss function is:

$$L(C) = -\Sigma_{k=1}^{K}(\log Pr(c_k | c_{1:k-1}, z_k)), \quad (10)$$

where $c_{1:k-1} = c_1 \ldots c_{k-1}$. Thus, in some embodiments, training unit 608 trains handwriting recognition model 604 by adjusting parameters of handwriting recognition model 604 (e.g., the parameters of encoder 802, attention model 804, and decoder 806) such that equation (10) is minimized. For example, at each training iteration, training unit 608 adjusts the weight matrices or vectors of equations (1), (2), (5), (6), (7), (8), and (9) to minimize equation (10).

One of skill in the art will appreciate that recognizing handwritten input (e.g., during run-time when a user inputs handwriting) may also include optimizing equation (10). For example, during run-time, attention model 804 and decoder 806 may be configured to output $z_k$ and $c_k$, respectively, so that equation (10) is minimized.

For description purposes, the systems and techniques herein have been discussed using examples of recognizing handwritten input in English (e.g., FIGS. 7A-D). However, the systems and techniques discussed herein are not limited to recognizing handwritten input in any particular language and can be used to recognize input in languages other than English, e.g., French, Spanish, German, Turkish, Chinese, Japanese, Korean, Hindi, and so on.

FIGS. 10A-C illustrate a flow diagram of process 1000 for recognizing handwritten input, according to some embodiments. In some embodiments, process 1000 is performed at one or more electronic devices (e.g., 100, 300, 500) each having one or more processors and memory. In some embodiments, process 1000 is performed using a client-server system, with the operations of process 1000 divided up in any manner between the client device(s) (e.g., 100, 300, 500) and the server. Some operations in process 1000 are, optionally, combined, the orders of some operations are, optionally, changed, and some operations are, optionally, omitted.

At block 1002, input data representing handwritten input is obtained (e.g., by formatting unit 602). The handwritten input is associated with a first dimension relative to the handwritten input and a second dimension relative to the handwritten input. In some embodiments, the input data corresponds to gesture input received on a display of an electronic device. In some embodiments, the handwritten input includes delayed input associated with one or more characters for the handwritten input.

At block 1004, the input data is sampled to obtain a plurality of coordinates representing the handwritten input (e.g., by formatting unit 602). In some embodiments, the input data includes a first set of coordinates and the plurality of coordinates are a subset of the first set of coordinates.

At block 1006, a sequence of vectors representing a respective plurality of portions of the handwritten input is determined based on the plurality of coordinates (e.g., by formatting unit 602). Each portion of the respective plurality of portions is associated with a respective height corresponding to the first dimension and a respective width corresponding to the second dimension, the respective height being greater than the respective width and consecutive vectors of the sequence of vectors represent respective consecutive portions of the handwritten input. In some embodiments, the respective heights are the same, the respective widths are the same, and each vector of the sequence of vectors is associated with a same dimension. In some embodiments, each portion of the respective plurality of portions is associated with a same respective spatial area. In some embodiments, a first part of the handwritten input is written after a second part of the handwritten input and a single vector of the sequence of vectors represents both the first part and the second part. In some embodiments, the first part and the second part each represent respective portions of a same character. In some embodiments, the first part represents a correction of the second part.

At block 1008, in some embodiments, a maximal height of the handwritten input (corresponding to the first dimension) is determined based on the plurality of coordinates (e.g., by formatting unit 602), and the respective heights associated with each portion of the plurality of portions are each the maximal height.

At block 1010, in some embodiments, a mesh is generated based on the plurality of coordinates (e.g., by formatting unit 602), the mesh including a plurality of cells.

At block 1012, in some embodiments, a maximal height of the handwritten input is determined based on the plurality of coordinates (e.g., by formatting unit 602), the maximal height corresponding to the first dimension.

At block 1014, in some embodiments, a maximal width of the handwritten input is determined based on the plurality of coordinates (e.g., by formatting unit 602), the maximal width corresponding to the second dimension.

At block 1016, in some embodiments, a height of the mesh is set to equal the maximal height (e.g., by formatting unit 602).

At block 1018, in some embodiments, a width of the mesh is set to equal the maximal width (e.g., by formatting unit 602).

At block 1020, in some embodiments, respective values for each cell of the plurality of cells are determined based on the plurality of coordinates (e.g., by formatting unit 602).

At block 1022, in some embodiments, the sequence of vectors is determined based on the respective values for each cell (e.g., by formatting unit 602). In some embodiments, each vector of the sequence of vectors corresponds to a respective column of the mesh, the respective column corresponding to the first dimension.

At block 1024, in some embodiments, values for each vector of the sequence of vectors are determined based on the values of the cells forming the respective column of the mesh (e.g., by formatting unit 602).

At block 1026, one or more characters for the handwritten input are generated using a handwriting recognition model (e.g., model 604) based on the sequence of vectors. In some embodiments, the handwriting recognition model includes a sequence-to-sequence model. In some embodiments, the handwriting recognition model includes an encoder (e.g., encoder 802), an attention model (e.g., attention model 804), and a decoder (e.g., decoder 806).

At block 1028, in some embodiments, the sequence of vectors is provided to the encoder to obtain an encoded representation of the sequence of vectors (e.g., by model 604).

At block 1030, in some embodiments, the encoded representation of the sequence of vectors is provided to the attention model to obtain an embedding representing the handwritten input (e.g., by model 604). In some embodiments, the attention model determines information representing an alignment between the plurality of portions and a state of the handwriting recognition model.

At block 1032, in some embodiments, the embedding is provided to the decoder to obtain a second sequence of vectors representing the one or more characters (e.g., by model 604). In some embodiments, a size of each vector of the second sequence of vectors is associated with a size of a character inventory available to the handwriting recognition model.

At block 1034, the one or more characters are caused to be displayed (e.g., by display unit 606). In some embodiments, the one or more characters include at least one of: a diacritical mark, a punctuation mark, and a symbol.

At block 1036, in some embodiments, the handwriting recognition model is trained using a corpus of handwritten input (e.g., by training unit 608), the corpus of handwritten input including a plurality of samples of handwritten input for respective sequences of characters.

The operations described above with reference to FIGS. 10A-C are optionally implemented by components depicted in FIG. 6. For example, the operations of process 1000 may be implemented by formatting unit 602, handwriting recognition model 604, display unit 606, and/or training unit 608. It would be clear to a person having ordinary skill in the art how other processes are implemented based on the components depicted in FIG. 6.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by one or more processors of an electronic device, cause the electronic device to:
    obtain input data representing handwritten input, wherein the handwritten input is associated with a first dimension relative to the handwritten input and a second dimension relative to the handwritten input;
    determine a sequence of vectors representing a respective plurality of portions of the handwritten input, wherein:
        each portion of the respective plurality of portions is associated with a respective height corresponding to the first dimension and a respective width corresponding to the second dimension, the respective height being greater than the respective width; and
        consecutive vectors of the sequence of vectors represent respective consecutive portions of the handwritten input;
    generate, based on the sequence of vectors, one or more characters for the handwritten input; and
    cause the one or more characters to be displayed.

2. The non-transitory computer-readable storage medium of claim 1, wherein the input data corresponds to gesture input received on a display of the electronic device.

3. The non-transitory computer-readable storage medium of claim 1, wherein the handwritten input includes delayed input associated with the one or more characters for the handwritten input.

4. The non-transitory computer-readable storage medium of claim 1, wherein each portion of the respective plurality of portions is associated with a same respective spatial area.

5. The non-transitory computer-readable storage medium of claim 1, wherein the one or more characters include at least one of:
    a diacritical mark;
    a punctuation mark; and
    a symbol.

6. The non-transitory computer-readable storage medium of claim 1, wherein:
    the respective heights are the same;
    the respective widths are the same; and
    each vector of the sequence of vectors is associated with a same dimension.

7. The non-transitory computer-readable storage medium of claim 6, wherein the one or more programs further comprise instructions, which when executed by the one or more processors, cause the electronic device to:
    determine a maximal height of the handwritten input corresponding to the first dimension, wherein the respective heights are each the maximal height.

8. The non-transitory computer-readable storage medium of claim 1, wherein:
    a first part of the handwritten input is written after a second part of the handwritten input; and
    a single vector of the sequence of vectors represents both the first part and the second part.

9. The non-transitory computer-readable storage medium of claim 8, wherein the first part and the second part each represent respective portions of a same character.

10. The non-transitory computer-readable storage medium of claim 8, wherein the first part represents a correction of the second part.

11. The non-transitory computer-readable storage medium of claim 1, wherein the one or more programs further comprise instructions, which when executed by the one or more processors, cause the electronic device to:
    sample the input data to obtain a plurality of coordinates representing the handwritten input, wherein the input data includes a first set of coordinates, and
    the plurality of coordinates are a subset of the first set of coordinates.

12. The non-transitory computer-readable storage medium of claim 11, wherein determining the sequence of vectors includes:
    generating a mesh based on the plurality of coordinates, the mesh comprising a plurality of cells;
    determining, based on the plurality of coordinates, respective values for each cell of the plurality of cells; and
    determining the sequence of vectors based on the respective values for each cell.

13. The non-transitory computer-readable storage medium of claim 12, wherein generating the mesh based on the plurality of coordinates includes:
    determining, based on the plurality of coordinates, a maximal height of the handwritten input, the maximal height corresponding to the first dimension;
    determining, based on the plurality of coordinates, a maximal width of the handwritten input, the maximal width corresponding to the second dimension;
    setting a height of the mesh to equal the maximal height; and
    setting a width of the mesh to equal the maximal width.

14. The non-transitory computer-readable storage medium of claim 12, wherein each vector of the sequence of vectors corresponds to a respective column of the mesh, the respective column corresponding to the first dimension, and wherein determining the sequence of vectors based on the respective values for each cell includes:

determining values for each vector of the sequence of vectors based on the values of the cells forming the respective column of the mesh.

15. The non-transitory computer-readable storage medium of claim 1, wherein:
generating the one or more characters for the handwritten input includes generating the one or more characters using a handwriting recognition model; and
the handwriting recognition model includes a sequence-to-sequence model.

16. The non-transitory computer-readable storage medium of claim 15, wherein:
the handwriting recognition model includes an encoder, an attention model; and a decoder; and
generating, using the handwriting recognition model, the one or more characters for the handwritten input includes:
providing the sequence of vectors to the encoder to obtain an encoded representation of the sequence of vectors;
providing the encoded representation of the sequence of vectors to the attention model to obtain an embedding representing the handwritten input; and
providing the embedding to the decoder to obtain a second sequence of vectors representing the one or more characters.

17. The non-transitory computer-readable storage medium of claim 16, wherein the attention model determines information representing an alignment between the plurality of portions and a state of the handwriting recognition model.

18. The non-transitory computer-readable storage medium of claim 16, wherein a size of each vector of the second sequence of vectors is associated with a size of a character inventory available to the handwriting recognition model.

19. The non-transitory computer-readable storage medium of claim 1, wherein the one or more programs further comprise instructions, which when executed by the one or more processors, cause the electronic device to:
train the handwriting recognition model using a corpus of handwritten input, the corpus of handwritten input including a plurality of samples of handwritten input for respective sequences of characters.

20. An electronic device, comprising:
one or more processors;
a memory; and
one or more programs, wherein the one or more programs are stored in the memory and configured to be executed by the one or more processors, the one or more programs including instructions for:
obtaining input data representing handwritten input, wherein the handwritten input is associated with a first dimension relative to the handwritten input and a second dimension relative to the handwritten input;
determining a sequence of vectors representing a respective plurality of portions of the handwritten input, wherein:
each portion of the respective plurality of portions is associated with a respective height corresponding to the first dimension and a respective width corresponding to the second dimension, the respective height being greater than the respective width; and
consecutive vectors of the sequence of vectors represent respective consecutive portions of the handwritten input;
generating, based on the sequence of vectors, one or more characters for the handwritten input; and
causing the one or more characters to be displayed.

21. A method for recognizing handwritten input, the method comprising:
at an electronic device with one or more processors and memory:
obtaining input data representing handwritten input, wherein the handwritten input is associated with a first dimension relative to the handwritten input and a second dimension relative to the handwritten input;
determining a sequence of vectors representing a respective plurality of portions of the handwritten input, wherein:
each portion of the respective plurality of portions is associated with a respective height corresponding to the first dimension and a respective width corresponding to the second dimension, the respective height being greater than the respective width; and
consecutive vectors of the sequence of vectors represent respective consecutive portions of the handwritten input;
generating, based on the sequence of vectors, one or more characters for the handwritten input; and
causing the one or more characters to be displayed.

22. The electronic device of claim 20, wherein the input data corresponds to gesture input received on a display of the electronic device.

23. The electronic device of claim 20, wherein the handwritten input includes delayed input associated with the one or more characters for the handwritten input.

24. The electronic device of claim 20, wherein each portion of the respective plurality of portions is associated with a same respective spatial area.

25. The electronic device of claim 20, wherein the one or more characters include at least one of:
a diacritical mark;
a punctuation mark; and
a symbol.

26. The electronic device of claim 20, wherein:
the respective heights are the same;
the respective widths are the same; and
each vector of the sequence of vectors is associated with a same dimension.

27. The electronic device of claim 26, wherein the one or more programs further include instructions for:
determining a maximal height of the handwritten input corresponding to the first dimension, wherein the respective heights are each the maximal height.

28. The electronic device of claim 20, wherein:
a first part of the handwritten input is written after a second part of the handwritten input; and
a single vector of the sequence of vectors represents both the first part and the second part.

29. The electronic device of claim 28, wherein the first part and the second part each represent respective portions of a same character.

30. The electronic device of claim 28, wherein the first part represents a correction of the second part.

31. The electronic device of claim 20, wherein the one or more programs further include instructions for:
sampling the input data to obtain a plurality of coordinates representing the handwritten input, wherein the input data includes a first set of coordinates, and the plurality of coordinates are a subset of the first set of coordinates.

32. The electronic device of claim 31, wherein determining the sequence of vectors includes:
generating a mesh based on the plurality of coordinates, the mesh comprising a plurality of cells;
determining, based on the plurality of coordinates, respective values for each cell of the plurality of cells; and
determining the sequence of vectors based on the respective values for each cell.

33. The electronic device of claim 32, wherein generating the mesh based on the plurality of coordinates includes:
determining, based on the plurality of coordinates, a maximal height of the handwritten input, the maximal height corresponding to the first dimension;
determining, based on the plurality of coordinates, a maximal width of the handwritten input, the maximal width corresponding to the second dimension;
setting a height of the mesh to equal the maximal height; and
setting a width of the mesh to equal the maximal width.

34. The electronic device of claim 32, wherein each vector of the sequence of vectors corresponds to a respective column of the mesh, the respective column corresponding to the first dimension, and wherein determining the sequence of vectors based on the respective values for each cell includes:
determining values for each vector of the sequence of vectors based on the values of the cells forming the respective column of the mesh.

35. The electronic device of claim 20, wherein:
generating the one or more characters for the handwritten input includes generating the one or more characters using a handwriting recognition model; and
the handwriting recognition model includes a sequence-to-sequence model.

36. The electronic device of claim 35, wherein:
the handwriting recognition model includes an encoder, an attention model, and a decoder; and
generating, using the handwriting recognition model, the one or more characters for the handwritten input includes:
providing the sequence of vectors to the encoder to obtain an encoded representation of the sequence of vectors;
providing the encoded representation of the sequence of vectors to the attention model to obtain an embedding representing the handwritten input; and
providing the embedding to the decoder to obtain a second sequence of vectors representing the one or more characters.

37. The electronic device of claim 36, wherein the attention model determines information representing an alignment between the plurality of portions and a state of the handwriting recognition model.

38. The electronic device of claim 36, wherein a size of each vector of the second sequence of vectors is associated with a size of a character inventory available to the handwriting recognition model.

39. The electronic device of claim 35, wherein the one or more programs further include instructions for:
training the handwriting recognition model using a corpus of handwritten input, the corpus of handwritten input including a plurality of samples of handwritten input for respective sequences of characters.

40. The method of claim 21, wherein the input data corresponds to gesture input received on a display of the electronic device.

41. The method of claim 21, wherein the handwritten input includes delayed input associated with the one or more characters for the handwritten input.

42. The method of claim 21, wherein each portion of the respective plurality of portions is associated with a same respective spatial area.

43. The method of claim 21, wherein the one or more characters include at least one of:
a diacritical mark;
a punctuation mark; and
a symbol.

44. The method of claim 21, wherein:
the respective heights are the same;
the respective widths are the same; and
each vector of the sequence of vectors is associated with a same dimension.

45. The method of claim 44, further comprising:
determining a maximal height of the handwritten input corresponding to the first dimension, wherein the respective heights are each the maximal height.

46. The method of claim 21, wherein:
a first part of the handwritten input is written after a second part of the handwritten input; and
a single vector of the sequence of vectors represents both the first part and the second part.

47. The method of claim 46, wherein the first part and the second part each represent respective portions of a same character.

48. The method of claim 46, wherein the first part represents a correction of the second part.

49. The method of claim 21, further comprising:
sampling the input data to obtain a plurality of coordinates representing the handwritten input, wherein the input data includes a first set of coordinates, and the plurality of coordinates are a subset of the first set of coordinates.

50. The method of claim 49, wherein determining the sequence of vectors includes:
generating a mesh based on the plurality of coordinates, the mesh comprising a plurality of cells;
determining, based on the plurality of coordinates, respective values for each cell of the plurality of cells; and
determining the sequence of vectors based on the respective values for each cell.

51. The method of claim 50, wherein generating the mesh based on the plurality of coordinates includes:
determining, based on the plurality of coordinates, a maximal height of the handwritten input, the maximal height corresponding to the first dimension;
determining, based on the plurality of coordinates, a maximal width of the handwritten input, the maximal width corresponding to the second dimension;
setting a height of the mesh to equal the maximal height; and
setting a width of the mesh to equal the maximal width.

52. The method of claim 50, wherein each vector of the sequence of vectors corresponds to a respective column of the mesh, the respective column corresponding to the first dimension, and wherein determining the sequence of vectors based on the respective values for each cell includes:
determining values for each vector of the sequence of vectors based on the values of the cell forming the respective column of the mesh.

53. The method of claim 21, wherein:
generating the one or more characters for the handwritten input includes generating the one or more characters using a handwriting recognition model; and
the handwriting recognition model includes a sequence-to-sequence model.

54. The method of claim 53, wherein:
the handwriting recognition model includes an encoder, an attention model, and a decoder; and
generating, using the handwriting recognition model, the one or more characters for the handwritten input includes:
  providing the sequence of vectors to the encoder to obtain an encoded representation of the sequence of vectors;
  providing the encoded representation of the sequence of vectors to the attention model to obtain an embedding representing the handwritten input; and
  providing the embedding to the decoder to obtain a second sequence of vectors representing the one or more characters.

55. The method of claim 54, wherein the attention model determines information representing an alignment between the plurality of portions and a state of the handwriting recognition model.

56. The method of claim 54, wherein a size of each vector of the second sequence of vectors is associated with a size of a character inventory available to the handwriting recognition model.

57. The method of claim 53, further comprising:
training the handwriting recognition model using a corpus of handwritten input, the corpus of handwritten input including a plurality of samples of handwritten input for respective sequences of characters.

\* \* \* \* \*

UNITED STATES PATENT AND TRADEMARK OFFICE
CERTIFICATE OF CORRECTION

PATENT NO. : 11,270,104 B2
APPLICATION NO. : 16/741384
DATED : March 8, 2022
INVENTOR(S) : Dominic L. Howell et al.

It is certified that error appears in the above-identified patent and that said Letters Patent is hereby corrected as shown below:

In the Claims

In Claim 13, Column 38, Line 62, delete "maxi mal" and insert -- maximal --, therefor.

In Claim 16, Column 39, Line 17, delete "model;" and insert -- model, --, therefor.

In Claim 19, Column 39, Line 41, delete "claim 1," and insert -- claim 15, --, therefor.

In Claim 36, Column 41, Line 41, delete "model;" and insert -- model, --, therefor.

In Claim 52, Column 42, Line 66, delete "cell" and insert -- cells --, therefor.

Signed and Sealed this
Nineteenth Day of April, 2022

Katherine Kelly Vidal
*Director of the United States Patent and Trademark Office*